United States Patent
Hashimoto et al.

(10) Patent No.: US 7,557,852 B2
(45) Date of Patent: Jul. 7, 2009

(54) IMAGE-TAKING APPARATUS, MAGNIFICATION VARIATION CONTROL METHOD, AND LENS UNIT

(75) Inventors: Naoki Hashimoto, Toyokawa (JP); Kazuaki Matsui, Osaka (JP); Hiroshi Mashima, Sakai (JP); Hideo Onishi, Sakai (JP); Mamoru Terada, Sakai (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 530 days.

(21) Appl. No.: 11/337,922

(22) Filed: Jan. 23, 2006

(65) Prior Publication Data

US 2007/0052834 A1 Mar. 8, 2007

(30) Foreign Application Priority Data

Sep. 2, 2005 (JP) ............................. 2005-254281
Sep. 2, 2005 (JP) ............................. 2005-254345

(51) Int. Cl.
*H04N 5/225* (2006.01)

(52) U.S. Cl. .................. 348/335; 348/345; 348/240.3; 348/240.99; 348/360; 352/38; 352/72; 352/121; 352/137; 359/365; 359/366; 359/721

(58) Field of Classification Search ................ 348/345, 348/359, 360, 335, 240.3, 240.99; 352/38, 352/72, 121, 137; 359/365, 366, 721
See application file for complete search history.

(56) References Cited

U.S. PATENT DOCUMENTS

| | | | |
|---|---|---|---|
| 6,356,307 B2 * | 3/2002 | Ohkawara et al. | 348/360 |
| 6,400,515 B1 * | 6/2002 | Kohno | 359/675 |
| 7,436,449 B2 * | 10/2008 | Mihara | 348/362 |
| 2001/0040626 A1 * | 11/2001 | Ohta et al. | 348/220 |
| 2001/0048479 A1 * | 12/2001 | Ohkawara et al. | 348/360 |
| 2004/0095504 A1 * | 5/2004 | Yasuda | 348/345 |
| 2004/0239785 A1 | 12/2004 | Nanjo et al. | 348/294 |
| 2005/0018071 A1 * | 1/2005 | Yasuda | 348/345 |

FOREIGN PATENT DOCUMENTS

| | | |
|---|---|---|
| JP | 8-37634 A | 2/1996 |
| JP | 9-37142 A | 2/1997 |
| JP | 11-187299 A | 7/1999 |
| JP | 2001-211373 A | 8/2001 |
| JP | 2002-131612 A | 5/2002 |
| JP | 2002-341243 A | 11/2002 |
| JP | 2003-338982 A | 11/2003 |
| JP | 2004-207781 A | 7/2004 |

OTHER PUBLICATIONS

Japanese "Notice of Reasons for Refusal" dated Feb. 19, 2008, for counterpart Japanese Application No. 2005-254281; Together with an English-language translation thereof.

* cited by examiner

*Primary Examiner*—David L Ometz
*Assistant Examiner*—Quang V Le
(74) *Attorney, Agent, or Firm*—Sidley Austin LLP

(57) ABSTRACT

A digital still camera switches an image sensor between moving picture shooting and still picture shooting. The digital still camera includes a variable-magnification optical system having a plurality of lens groups of which four are movable. At least one of the movable lens groups travels different movement trails for magnification variation between during zooming in moving picture shooting and during zooming in still picture shooting.

33 Claims, 16 Drawing Sheets

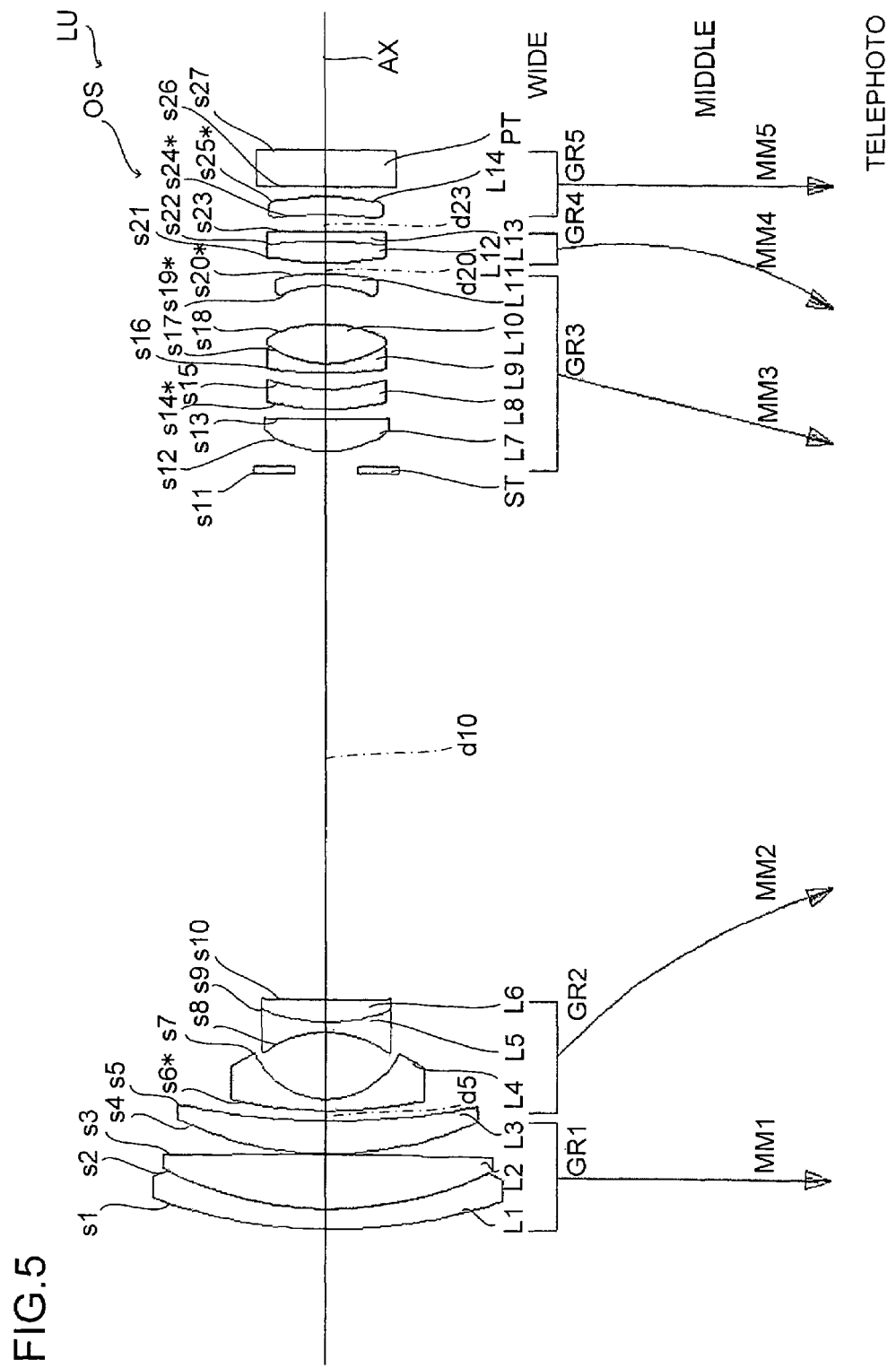

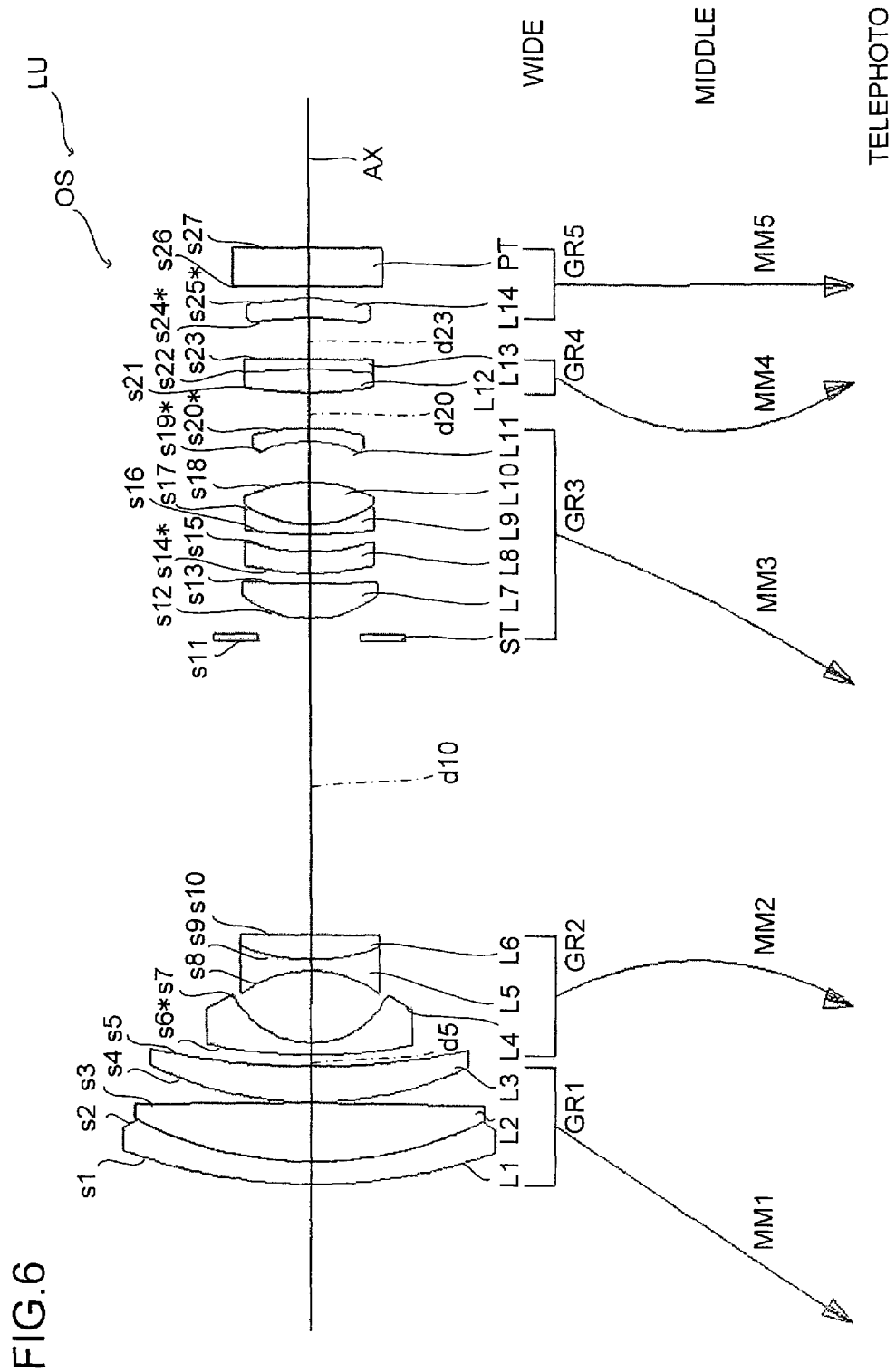

WIDE FNO=2.88

— d
— — g
- - - - SC

-0.2  0.2
SPHERICAL SINE
ABERRATION CONDITION

WIDE Y'=1.5

- - - - DM
—— DS

-0.2  0.2
ASTIGMATISM

WIDE Y'=1.5

-5.0  5.0
DISTORTION

MIDDLE FNO=4.50

— d
— — g
- - - - SC

-0.2  0.2
SPHERICAL SINE
ABERRATION CONDITION

MIDDLE Y'=1.5

- - - - DM
—— DS

-0.2  0.2
ASTIGMATISM

MIDDLE Y'=1.5

-5.0  5.0
DISTORTION

TELEPHOTO FNO=4.60

— d
— — g
- - - - SC

-0.2  0.2
SPHERICAL SINE
ABERRATION CONDITION

TELEPHOTO Y'=1.5

- - - - DM
—— DS

-0.2  0.2
ASTIGMATISM

TELEPHOTO Y'=1.5

-5.0  5.0
DISTORTION

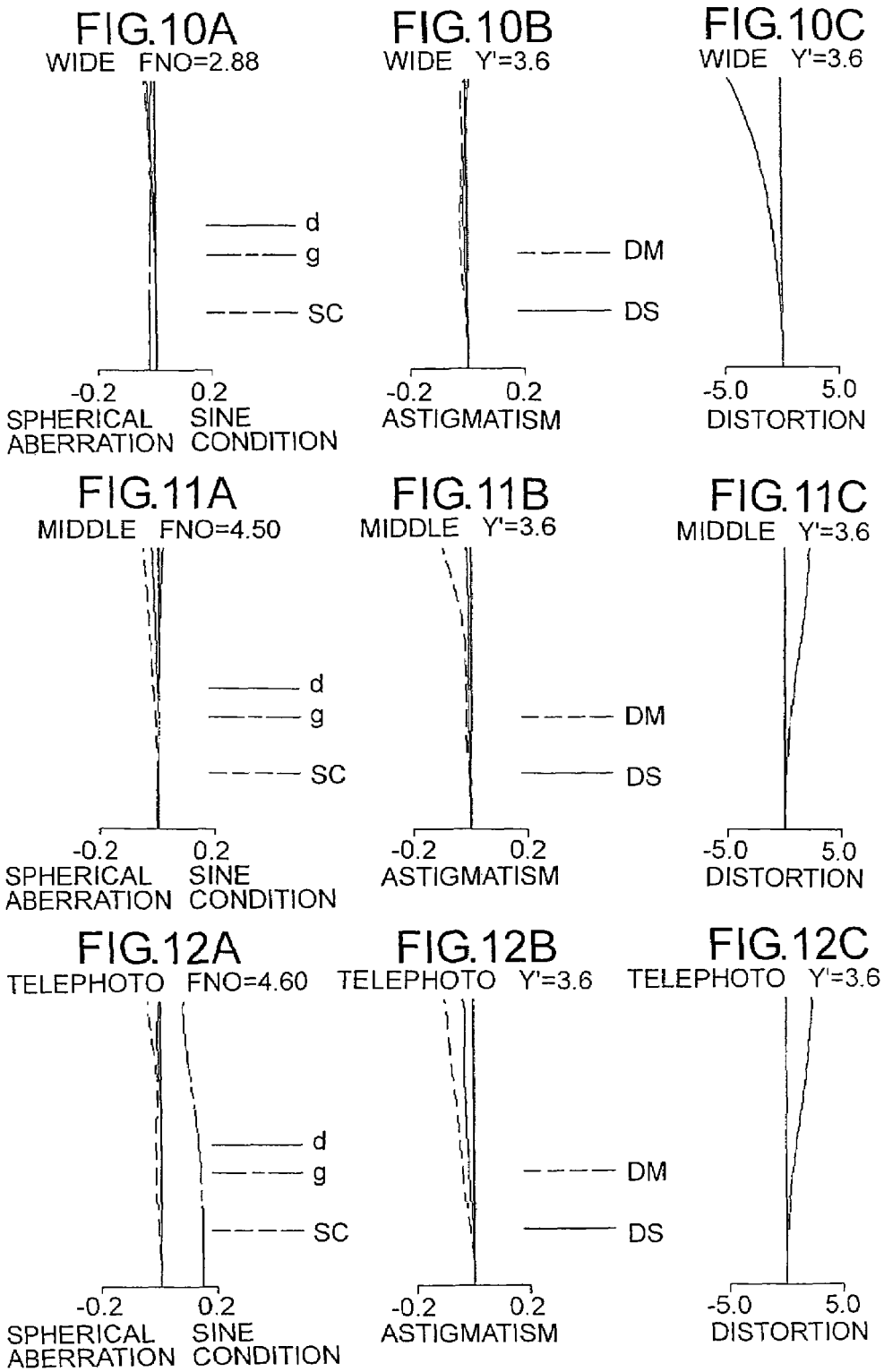

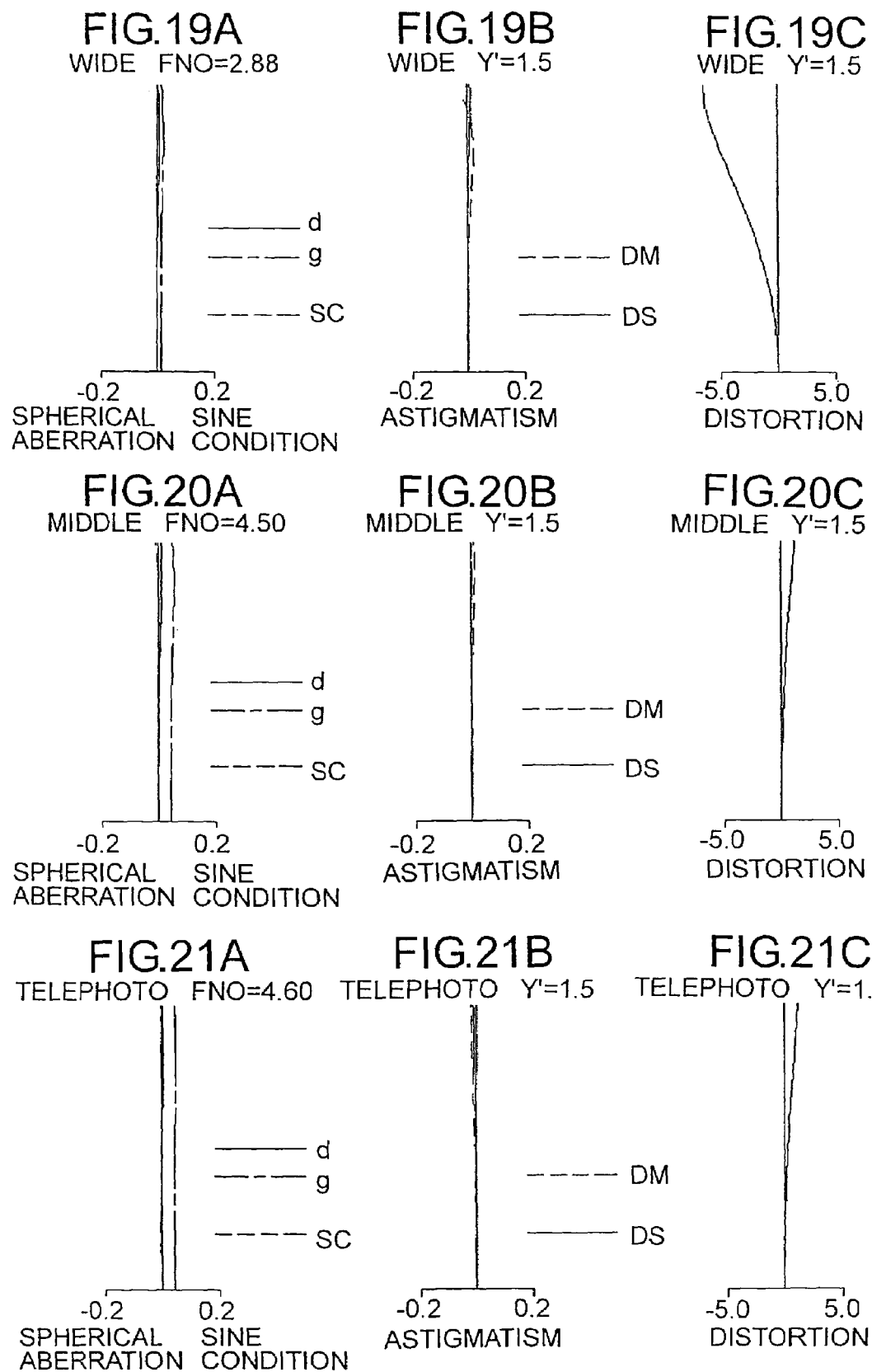

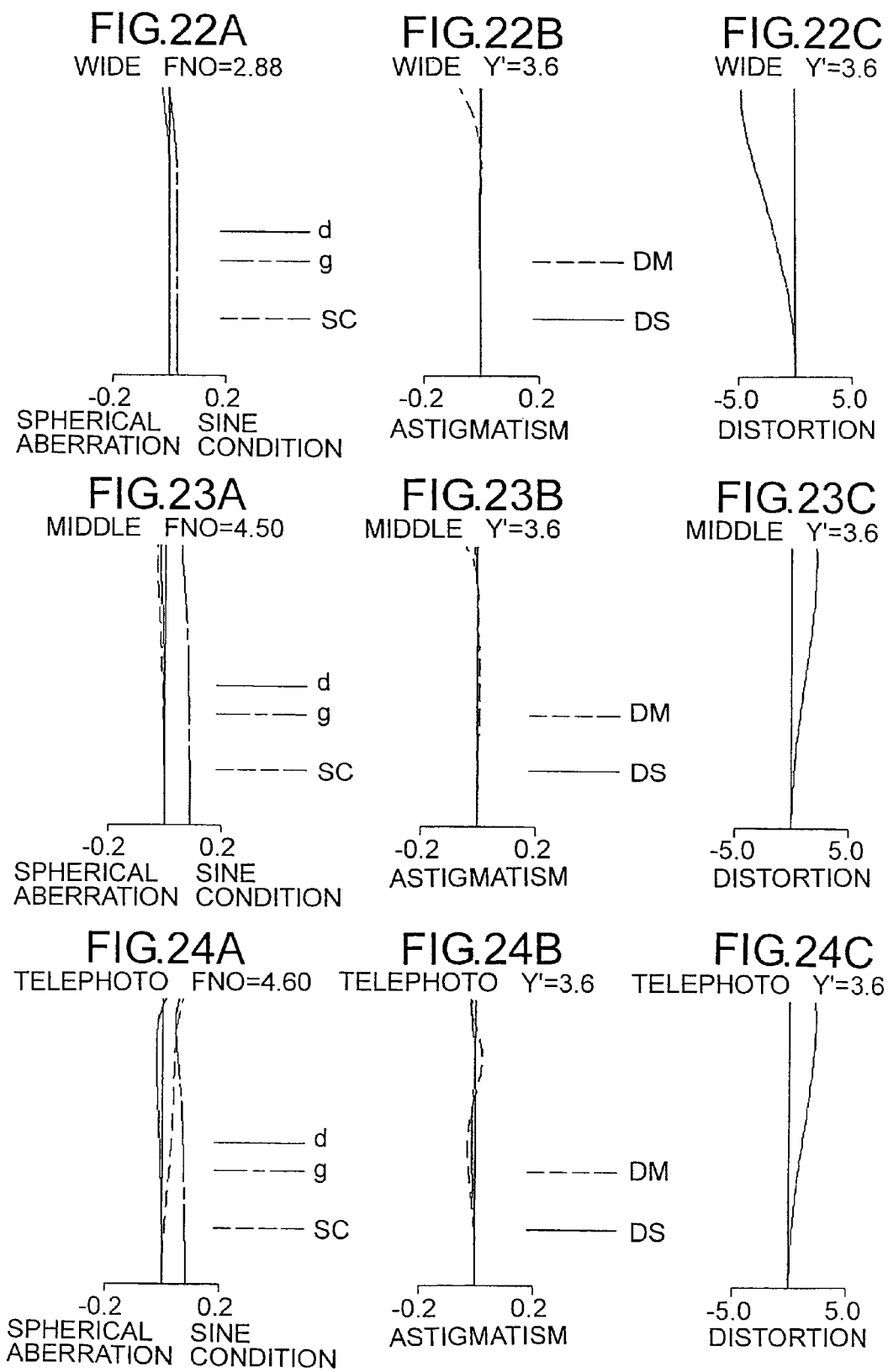

IMAGE-TAKING APPARATUS, MAGNIFICATION VARIATION CONTROL METHOD, AND LENS UNIT

This application is based on Japanese Patent Application No. 2005-254281 filed on Sep. 2, 2005 and Japanese Patent Application No. 2005-254345 filed on Sep. 2, 2005, the contents of which are hereby incorporated by reference.

BACKGROUND OF THE INVENTION

1. Field of the Invention

The present invention relates to a lens unit having a variable-magnification optical system, and to an image-taking apparatus or the like that is capable of shooting both moving and still pictures.

2. Description of Related Art

In recent years, various types of digital still camera (DSCs) capable of shooting both moving and still pictures have been developed. Such DSCs are proposed, for example, in Patent Publications 1 to 3 listed below.

Patent Publication 1: Japanese Patent Application Laid-open No. 2001-211373, laid-open on Aug. 3, 2001;
Patent Publication 2: Japanese Patent Application Laid-open No. 2002-131612, laid-open on May 9, 2002;
Patent Publication 3: Japanese Patent Application Laid-open No. 2004-207781, laid-open on Jul. 22, 2004;

In such DSCs (image-taking apparatuses) capable of shooting both moving and still pictures, advancements are sought in the following aspects:

(i) High performance (effectively corrected various aberrations, high magnification, high zoom ratio, etc.)
(ii) Compactness, for higher portability etc.
(iii) No zooming noise (produced as lens groups move) recorded while a moving picture is being shot It is, however, difficult to simultaneously meet all of the three requirements above. For example, in the DSC proposed in Patent Publication 1, zooming (magnification variation) is inhibited while a moving picture is being shot. Certainly this design prevents zooming noise from being recorded while a moving picture is being shot. Disadvantageously, however, the DSC proposed in Patent Publication 1 achieves this at the sacrifice of zooming capability, and thus at the cost of high performance.

In the DSC proposed in Patent Publication 2, the variable range of the focal length of the optical system is varied between for still picture shooting and moving picture shooting. Specifically, the variable range of the focal length for still picture shooting is limited so as to be narrower than the variable range of the focal length for moving picture shooting (in particular in the wide-angle region). Certainly this design helps eliminate the influence of various aberrations in the wide-angle region in still image shooting. Disadvantageously, however, the DSC proposed in Patent Publication 2 achieves this at the sacrifice of the magnification variation factor, and thus at the cost of high performance.

In the DSC proposed in Patent Publication 3, during both moving picture shooting and still picture shooting, first the first lens group (most object-side lens group) is moved out, and then zooming is performed with the other lens groups. Certainly, this design keeps stationary the first lens group, whose movement is the major cause for zooming noise, and thus helps reduce zooming noise.

In the DSC proposed in Patent Publication 3, however, even in still picture shooting, the first lens group is moved out. Thus, the first lens group needs to be built so as to receive rays incoming at comparatively large angles of view when a still picture is shot. That is, the first lens group needs to be given a comparative large lens diameter (front element diameter etc.). Thus, the DSC proposed in Patent Publication 3 operates with reduced zooming noise in moving picture shooting, but, disadvantageously, at the cost of compactness and high performance.

SUMMARY OF THE INVENTION

In view of the conventionally encountered disadvantages discussed above, it is an object of the present invention to provide an image-taking apparatus or the like that simultaneously meet the three requirements noted above.

To achieve the above object, according to the present invention, an image-taking apparatus is provided with: a variable-magnification optical system that includes a plurality of lens groups of which at least one is movable along the optical axis by being driven by a movement mechanism; and an image sensor that receives light from a shooting object as captured by the variable-magnification optical system. Moreover, in this image-taking apparatus, the image sensor is switchable between moving picture shooting and still picture shooting.

In addition, in the image-taking apparatus according to the present invention, at least one of movable lens groups travels different movement trails during magnification variation between in moving picture shooting and in still image shooting.

Such movement of a lens group traveling different movement trails can be achieved in various ways. For example, in a case where the image-taking apparatus is so designed that, of the plurality of lens groups, at least two are movable so as to capture light between at a first angle of view (at the wide-angle end) and at a second angle of view (at the telephoto end), the movable lens groups are so moved that, while the total length of the variable-magnification optical system remains constant during magnification variation between the first angle of view and the second angle of view in moving picture shooting, the total length of the variable-magnification optical system varies during magnification variation between the first angle of view and the second angle of view in still picture shooting.

Alternatively, in a case where the image-taking apparatus is so designed that, of the plurality of lens groups, at least three are movable so as to capture light between at a first angle of view and at a second angle of view, the movable lens groups may be so moved that the number of lens groups that move during magnification variation between the first angle of view and the second angle of view in moving picture shooting is smaller than the number of lens groups that move during magnification variation between the first angle of view and the second angle of view in still picture shooting.

No matter what pattern of movement is adopted, the image-taking apparatus according to the present invention achieves magnification variation based on one of various patterns of movement of the individual lens groups that suits the type of shooting (moving picture shooting or still picture shooting).

Thus, no matter what pattern of movement is adopted, in the image-taking apparatus according to the present invention, magnification variation is performed by a magnification variation control method involving, for magnification variation in moving picture shooting, a first movement step of moving at least one of the plurality of lens groups to a predetermined position regardless of the magnification variation factor and a second movement step of moving at least one of the lens groups other than the lens group moved in the first movement step to a position that suits the magnification variation factor and, for magnification variation in still picture shooting, a third movement step of moving a plurality of lens groups including the lens group moved to the predetermined position to a position that suits the magnification variation factor.

In the above-described image-taking apparatus according to the present invention, it is preferable that, of the plurality of lens groups, the most object-side lens group remain stationary during magnification variation in moving picture shooting, and move during magnification variation in still picture shooting. In other words, it is preferable that the lens group that moves in the first movement step be the most object-side one of the plurality of lens groups.

When, in this way, the most object-side lens group remains stationary in a predetermined position during magnification variation in moving picture shooting, no noise (zooming noise) is produced as would be produced if the most object-side lens group were moved for magnification variation. Considering in particular that the movement distance of the most object-side lens group conventionally tends to be longer than those of the other lens groups, the image-taking apparatus according to the present invention, by preventing such noise from being recorded, effectively overcomes the problem of zooming noise.

Moreover, in the image-taking apparatus according to the present invention, during magnification variation in still picture shooting, the most object-side lens group is moved to suit the magnification variation factor. For example, when the most object-side lens group is so moved as to capture light at the telephoto end in still picture shooting, in the image-taking apparatus according to the present invention, the most object-side lens group is moved out not so mush as during magnification variation in moving picture shooting (that is, not as far as the predetermined position). With this design, the image-taking apparatus according to the present invention permits the most object-side lens group (and thus the variable-magnification optical system) to be made comparatively compact.

Moreover, in the image-taking apparatus according to the present invention, during magnification variation in still picture shooting, the most object-side lens group is movable. Thus, even when the most object-side lens group is of the same size as one provided in an image-taking apparatus (conventional) that performs magnification variation in still picture shooting while keeping the most object-side lens group stationary, the image-taking apparatus according to the present invention permits shooting at a higher magnification than the conventional image-taking apparatus.

Thus, according to the present invention, it is possible to realize an image-taking apparatus that, while offering high performance, includes a compact variable-magnification optical system. In addition, since the most object-side lens group and the like can be kept stationary, it is possible to realize an image-taking apparatus that operates with acceptably reduced noise.

To effectively overcome the problem of zooming noise, the weights of the lens groups may be taken into consideration. For example, in the image-taking apparatus according to the present invention, of the plurality of lens groups, the heaviest one (the heaviest lens group) may be kept stationary during magnification variation in moving picture shooting while it is movable during magnification variation in still picture shooting. That is, the lens group that moves in the first movement step may be the heaviest of the plurality of lens groups.

With this design, the image-taking apparatus according to the present invention performs zooming in moving picture shooting by moving, not the heaviest lens group, but the other lighter lens groups. Thus, the image-taking apparatus according to the present invention can reduce the driving noise of a driving source or the like that makes the heaviest lens group move, whose movement is the major cause of zooming noise.

As described above, according to the present invention, the lens groups in the variable-magnification optical system move in different ways between in moving picture shooting and in still picture shooting. Thus, in the image-taking apparatus according to the present invention, for example, while the most object-side lens group is kept stationary during magnification variation in moving picture shooting, it is movable during magnification variation in still picture shooting.

In this way, the noise resulting from the movement of the most object-side lens group is reduced. On the other hand, the most object-side lens group moves during magnification variation in still picture shooting, and this movement of the most object-side lens group helps achieve high performance (for example, a high magnification). Thus, according to the present invention, it is possible to realize an image-taking apparatus that offers quite operation, high performance, etc.

The above and other objects and features of the present invention will be made clearer by way of preferred embodiments described below with reference to the accompanying drawings.

BRIEF DESCRIPTION OF THE DRAWINGS

FIG. 5 is a lens construction diagram of a lens unit (the first embodiment) embodying the present invention, in a state in moving picture shooting;

FIG. 6 is a lens construction diagram of the lens unit (the first embodiment) embodying the present invention, in a state in still picture shooting;

FIG. 10A is a spherical aberration diagram of the lens unit (the first embodiment), as observed when it is zoomed to the wide-angle end W in still picture shooting;

FIG. 10B is an astigmatism diagram of the lens unit (the first embodiment), as observed when it is zoomed to the wide-angle end W in still picture shooting;

FIG. 10C is a distortion diagram of the lens unit (the first embodiment), as observed when it is zoomed to the wide-angle end W in still picture shooting;

FIG. 11A is a spherical aberration diagram of the lens unit (the first embodiment), as observed when it is zoomed to the middle-focal-length position M in still picture shooting;

FIG. 11B is an astigmatism diagram of the lens unit (the first embodiment), as observed when it is zoomed to the middle-focal-length position M in still picture shooting;

FIG. 11C is a distortion diagram of the lens unit (the first embodiment), as observed when it is zoomed to the middle-focal-length position M in still picture shooting;

FIG. 12A is a spherical aberration diagram of the lens unit (the first embodiment), as observed when it is zoomed to the telephoto end T in still picture shooting;

FIG. 12B is an astigmatism diagram of the lens unit (the first embodiment), as observed when it is zoomed to the telephoto end T in still picture shooting;

FIG. 12C is a distortion diagram of the lens unit (the first embodiment), as observed when it is zoomed to the telephoto end T in still picture shooting;

FIG. 19A is a spherical aberration diagram of the lens unit (the second embodiment), as observed when it is zoomed to the wide-angle end W in moving picture shooting;

FIG. 19B is an astigmatism diagram of the lens unit (the second embodiment), as observed when it is zoomed to the wide-angle end W in moving picture shooting;

FIG. 19C is a distortion diagram of the lens unit (the second embodiment), as observed when it is zoomed to the wide-angle end W in moving picture shooting;

FIG. 20A is a spherical aberration diagram of the lens unit (the second embodiment), as observed when it is zoomed to the middle-focal-length position M in moving picture shooting;

FIG. 20B is an astigmatism diagram of the lens unit (the second embodiment), as observed when it is zoomed to the middle-focal-length position M in moving picture shooting;

FIG. 20C is a distortion diagram of the lens unit (the second embodiment), as observed when it is zoomed to the middle-focal-length position M in moving picture shooting;

FIG. 21A is a spherical aberration diagram of the lens unit (the second embodiment), as observed when it is zoomed to the telephoto end T in moving picture shooting;

FIG. 21B is an astigmatism diagram of the lens unit (the second embodiment), as observed when it is zoomed to the telephoto end T in moving picture shooting;

FIG. 21C is a distortion diagram of the lens unit (the second embodiment), as observed when it is zoomed to the telephoto end T in moving picture shooting;

FIG. 22A is a spherical aberration diagram of the lens unit (the second embodiment), as observed when it is zoomed to the wide-angle end W in still picture shooting;

FIG. 22B is an astigmatism diagram of the lens unit (the second embodiment), as observed when it is zoomed to the wide-angle end W in still picture shooting;

FIG. 22C is a distortion diagram of the lens unit (the second embodiment), as observed when it is zoomed to the wide-angle end W in still picture shooting;

FIG. 23A is a spherical aberration diagram of the lens unit (the second embodiment), as observed when it is zoomed to the middle-focal-length position M in still picture shooting;

FIG. 23B is an astigmatism diagram of the lens unit (the second embodiment), as observed when it is zoomed to the middle-focal-length position M in still picture shooting;

FIG. 23C is a distortion diagram of the lens unit (the second embodiment), as observed when it is zoomed to the middle-focal-length position M in still picture shooting;

FIG. 24A is a spherical aberration diagram of the lens unit (the second embodiment), as observed when it is zoomed to the telephoto end T in still picture shooting;

FIG. 24B is an astigmatism diagram of the lens unit (the second embodiment), as observed when it is zoomed to the telephoto end T in still picture shooting; and FIG. 24C is a distortion diagram of the lens unit (the second embodiment), as observed when it is zoomed to the telephoto end T in still picture shooting.

DETAILED DESCRIPTION OF PREFERRED EMBODIMENTS

First Embodiment

An embodiment of the present invention will be described below with reference to the relevant drawings.

1. Configuration of a Digital Still Camera

Figure 1:
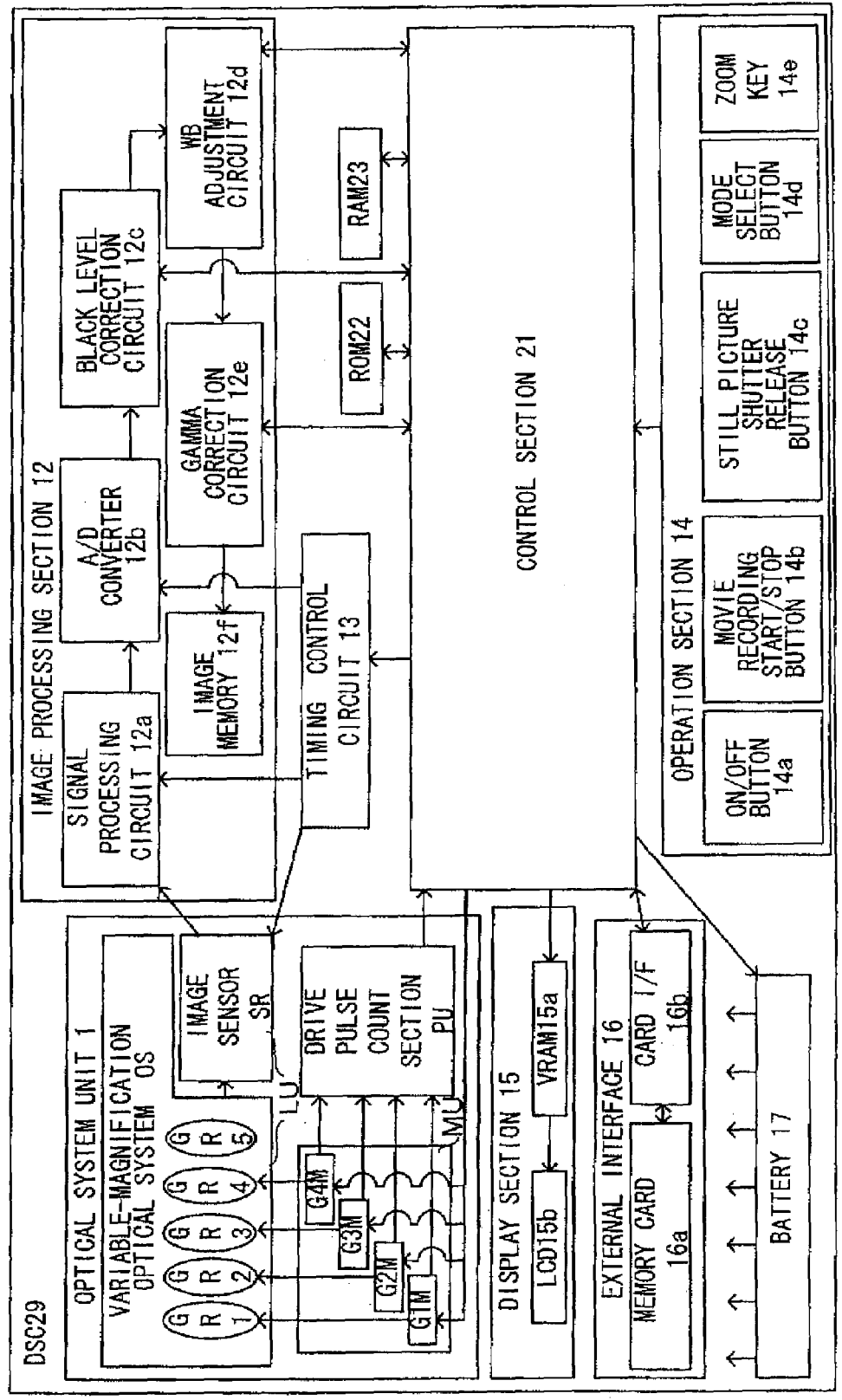
FIG. 1 is a diagram schematically showing the configuration of a digital still camera (DSC) embodying the present invention.

FIG. 1 is a diagram schematically showing the configuration of a digital camera (DSC) 29 taken up as an example of an image-taking apparatus embodying the present invention. As shown in FIG. 1, the DSC 29 includes: an optical system unit 1; an image processing section 12; a timing control circuit 13; an operation section 14; a display section 15; an external interface 16; a battery 17; a control section 21; a ROM 22; and a RAM 23.

1-1. Optical System Unit

The optical system unit 1 includes: a variable-magnification optical system OS having a plurality of lens groups GR1 to GR5; an image sensor SR; a lens group moving section MU; and a drive pulse count section PU.

The variable-magnification optical system OS is housed inside a lens barrel, which is unillustrated in FIG. 1, and serves to capture the light from a subject (shooting object). The variable-magnification optical system OS and the lens barrel will be described in detail later.

The image sensor SR receives the light (optical image) captured by the variable-magnification optical system OS, and converts it into an electrical signal (electronic data). The image sensor SR is, for example, a CCD (charge-coupled device) area sensor or a CMOS (complementary metal-oxide-semiconductor) sensor. The image sensor SR has a large number of three types of pixels that selectively receive red (R), green (G), and blue (B) light, respectively.

Under the control of the control section 21, which will be described later, the DSC 29 of this embodiment performs either moving picture shooting (in moving picture shooting mode) or still picture shooting (in still picture shooting mode). For this reason, in the DSC 29 of this embodiment, the image-sensing area (image-sensing size) on the image sensor SR that is used in moving picture shooting is smaller than the image-sensing area on the image sensor SR that is used in still picture shooting. This is because moving picture shooting does not require so high performance (for example, high pixel number and high resolution) as required by still picture shooting.

To shoot a moving picture with high performance, the individual functional blocks such as the control section 21 need to perform processing at high speed. By reducing the image-sensing area on the image sensor SR that is used in moving picture shooting as described above, it is possible to alleviate the burden of high-speed processing and the like. This eliminates the need for a high-performance and hence expensive control section and the like required for high-speed processing and the like, contributing to cost reduction of the DSC.

The lens group moving section (driving source) MU serves to move the lens groups GR in the variable-magnification optical system OS. The lens group moving section MU is built with, for example, stepping motors G1M to G4M (driving sources) provided one for each of the lens groups to be moved (for example, GR1 to GR4).

The drive pulse count section PU counts the driving pulses of the stepping motors G1M to G4M and thereby measures the movement distances of the movable lens groups (for example, GR1 to GR4) to find the positions thereof.

1-2. Image Processing Section

The image processing section 12 serves to generate image data from the electronic data produced by the image sensor SR. Specifically, the image processing section 12 includes: a signal processing circuit 12a; an A/D converter 12b; a black level correction circuit 12c; a white balance adjustment circuit (WB adjustment circuit) 12d; a gamma correction circuit 12e; and an image memory 12f.

The signal processing circuit 12a processes the analog signals outputted from the individual pixels of the image sensor SR. The A/D converter 12b converts into digital signals the analog signals having been processed by the signal processing circuit 12a.

The black level correction circuit 12c corrects the overall level of the digital signals. The WB adjustment circuit 12d adjusts the levels of the three-color, specifically R, G, and B, signals outputted from the three types of pixels of the image sensor SR, and thereby adjusts the white balance of an image.

The gamma correction circuit 12e performs non-linear processing on the digital signals to make them suitable for display. The image memory 12f temporarily stores the image data produced through the signal processing circuit 12a, the A/D converter 12b, the black level correction circuit 12c, the WB adjustment circuit 12d, and the gamma correction circuit 12e.

1-3. Timing Control Circuit

The timing control circuit 13 produces, from a reference clock fed from the control section 21, control signals with which to drive the image sensor SR, the signal processing circuit 12a, and the A/D converter 12b.

1-4. Operation Section

The operation section 14 is built with bottoms, switches, and the like by means of which various operation instructions from the user are fed to the control section 21. In the DSC 29 of this embodiment, the operation section 14 includes, at least: an on/off button 14a for turning the DSC 29 as a whole on and off; a movie recording start/stop button 14b for starting and stopping shooting of a moving picture; a still picture shutter release button 14c for shooting a still picture; a mode select button (switcher) 14d for switching between different shooting modes (moving picture shooting mode and still picture shooting mode); and a zoom key 14e for performing zooming in moving picture shooting or still picture shooting.

1-5. Display Section

The display section 15 includes a VRAM 15a and an LCD 15b. The VRAM 15a stores the image data to be displayed on the LCD 15b. The LCD 15b displays various kinds of data including the image data stored in the VRAM 15a.

1-6. External Interface Section

The external interface 16 includes a memory card 16a, and a card interface (card I/F) 16b that handles input and output to and from the memory card 16a.

1-7. Battery and Control Section

The battery 17 feeds electric power to the various components mentioned thus far. The control section 21 serves as the nerve center that controls, among others, the operation of the DSC 29 as a whole; that is, the control section 21 controls the different components of the DSC 29 in a coordinated manner so as to control it in a concentrated fashion.

For example, in the DSC 29 of this embodiment, the control section 21 performs control for permitting both moving picture shooting (shooting of a first type) and still picture shooting (shooting of a second type), performs control for driving the stepping motors G1M to G4M, performs control for setting the image-sensing area on the image sensor SR, and the like.

1-8. ROM and RAM

The ROM (read-only memory) 22 or RAM (random-access memory) 23 stores control programs, data tables, and the like that the control section 21 needs in order to control the operation of the various components.

Figure 2:
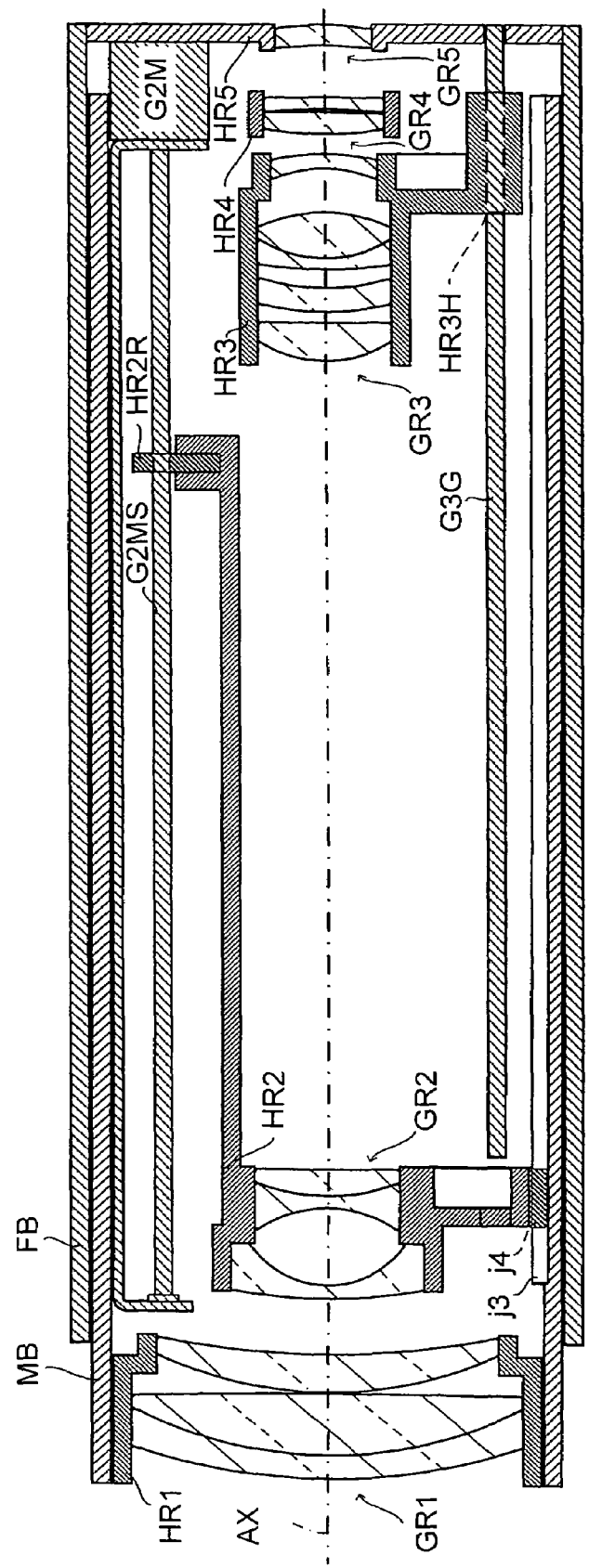
FIG. 2 is a sectional view schematically showing the interior structure of a lens barrel in which a variable-magnification optical system is housed, illustrating in particular how the second and fifth lens groups are rested.
Figure 3:
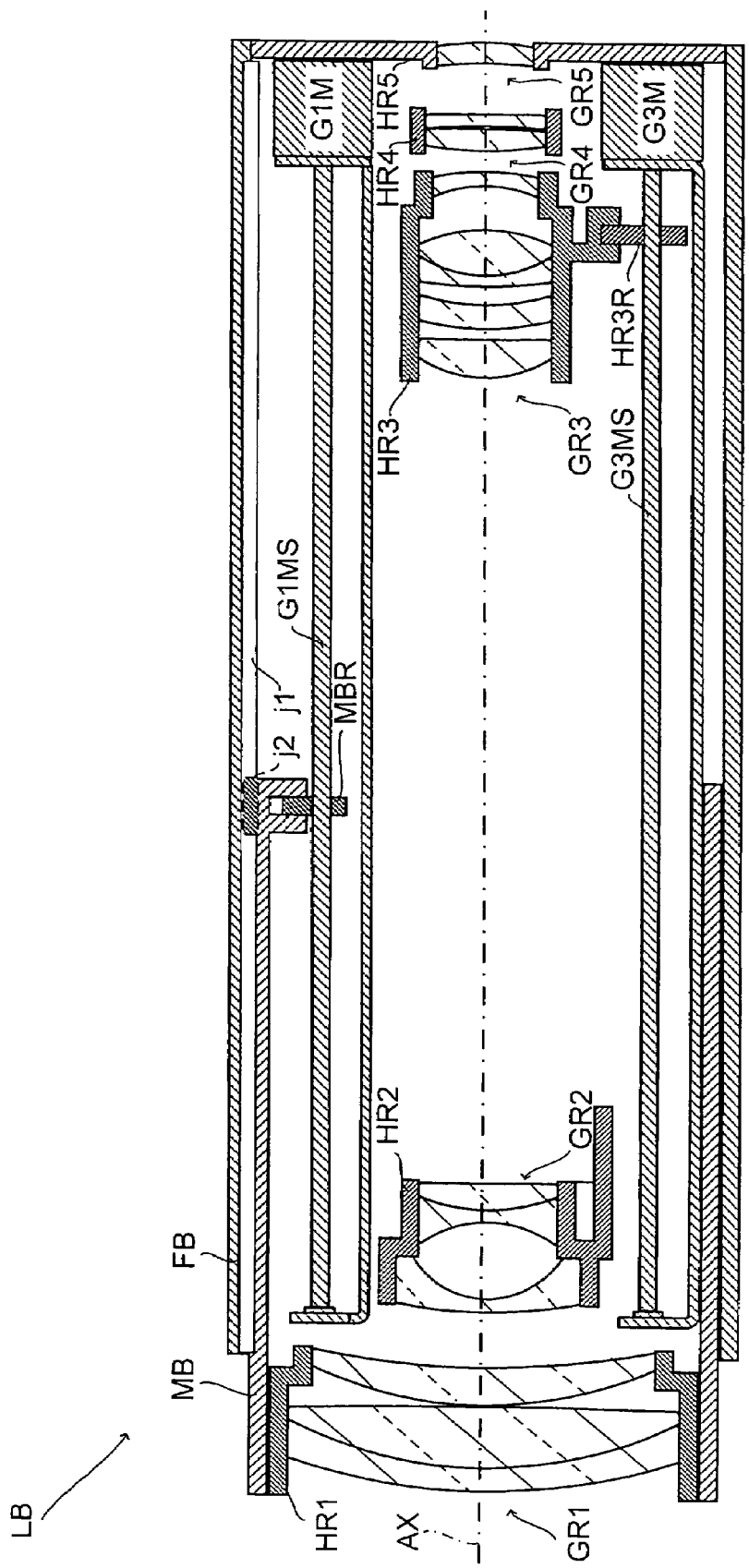
FIG. 3 is a sectional view schematically showing the interior structure of a lens barrel in which a variable-magnification optical system is housed, illustrating in particular how the first, third, and fifth lens groups are rested.
Figure 4:
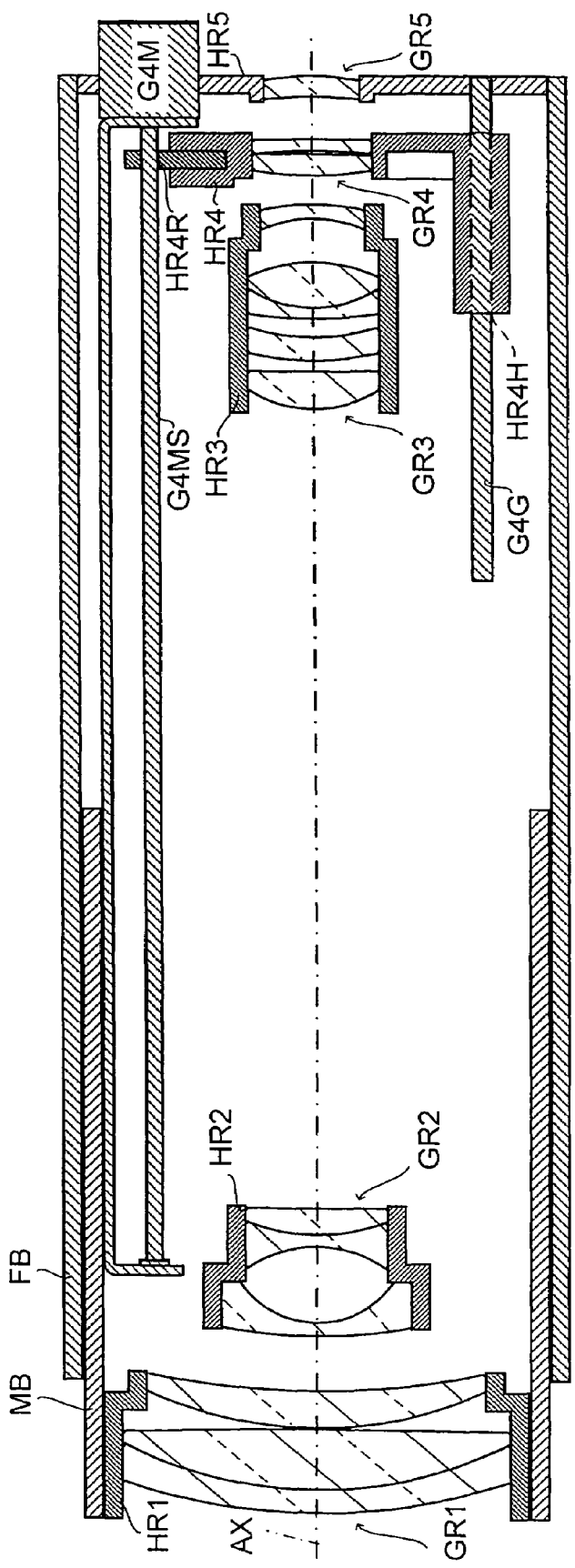
FIG. 4 is a sectional view schematically showing the interior structure of a lens barrel in which a variable-magnification optical system is housed, illustrating in particular how the fourth and fifth lens groups are rested.

2. Variable-Magnification Optical System and Lens Barrel 2-1. Structure of the Variable-Magnification Optical System and the Lens Barrel Now, with reference to FIGS. 2 to 4, the variable-magnification optical system OS and the lens barrel (movement mechanism) provided in the optical system unit 1. The variable-magnification optical system OS is housed inside the lens barrel (movement mechanism LB). FIGS. 2 to 4 show the interior structure of the lens barrel LB. As shown in these diagrams, the lens barrel LB includes a fixed barrel FB and a movable barrel MB. The lens barrel LB together with the stepping motors, the lens group holders, and the like described later may altogether be referred to as the lens barrel (movement mechanism) LB.

The fixed barrel FB is fitted to the body (unillustrated) of the DSC 29, and serves as the base part of the lens barrel LB. As shown in FIG. 3, in the inner wall of the fixed barrel FB, a guide groove (movable barrel guide groove) j1 is formed to extend in the same direction as the direction of the barrel axis.

The movable barrel MB is housed inside the fixed barrel FB, and has a claw (movement barrel claw) j2, which fits in the movable barrel guide groove j1, formed so as to protrude from the surface (outer wall) of the movable barrel MB (see FIG. 3). Thus, via the movement barrel claw j2 that fits in (engages with) the movable barrel guide groove j1 of the fixed barrel FB, the movable barrel MB is movable back and forth along the direction of the barrel axis. As shown in FIG. 2, in the inner wall of the movable barrel MB, a guide groove (second lens group holder guide groove) j3 that guides the movement of the second lens group holder HR2, which will be described later, is formed to extend along the direction of the barrel axis of the movable barrel.

The variable-magnification optical system OS is housed inside the lens barrel LB, and includes five lens groups (GR1 to GR5) arranged from object side to image side (image sensor side). Specifically, the variable-magnification optical system OS includes, from the object side to image side, a first lens group GR1, a second lens group GR2, a third lens group GR3, a fourth lens group GR4, and a fifth lens group GR5. The optical axis (optical axis direction) AX of the variable-magnification optical system OS runs in the same direction as the direction of the barrel axis of the fixed barrel FB and the movable barrel MB.

On the image side of the fifth lens group GR5, an infrared cut filter (unillustrated) is provided, and, further on the image side of the infrared cut filter (IR cut filter) PT, the image sensor (unillustrated in FIGS. 2 to 4). The lens groups GR1 to GR5 together with the IR cut filter PT may altogether be referred to as the variable-magnification optical system OS. In that case, the fifth lens group GR5 together with the IR cut filter PT is altogether referred to as the fifth lens group GR5. Moreover, the lens groups GR1 to GR5 along with the IR cut filter PT and the image sensor SR are altogether referred to as a lens unit LU.

2-2. Rested State and Movement Mechanism of the Individual Lens Groups GR1 to GR5

Now, with reference to FIGS. 2 to 4, the rested state and the movement mechanism of the individual lens groups GR1 to GR5 will be described. For the sake of convenience, FIG. 2 is a sectional view schematically showing the lens barrel LB, illustrating in particular how the second and fifth lens groups are rested, FIG. 3 is a sectional view schematically showing the lens barrel LB, illustrating in particular how the first, third, and fifth lens groups are rested, and FIG. 4 is a sectional view schematically showing the lens barrel LB, illustrating in particular how the fourth and fifth lens groups are rested.

2-2-1. Rested State of the Fifth Lens Group

As shown in FIGS. 2 to 4, the fifth lens group GR5 is held by a fifth lens group holder HR5 provided in an image-side end portion of the fixed barrel FB. The fifth lens group holder HR5 is fixedly provided. Thus, during zooming by the DSC 29, the fifth lens group GR5 remains stationary.

The fifth lens group holder HR5 is provided with four stepping motors (first to fourth lens group motors G1M to G4M) and two guide shafts (third and fourth lens group guide shafts G3G and G4G). The rotary shafts G1MS to G4MS of the stepping motors G1M to G4M and the guide shafts G3G and G4G extend toward the object side (those shafts run in the same direction as the direction of the optical axis AX).

2-2-2. Rested State and Movement Mechanism of the Second Lens Group

As shown in FIG. 2, the second lens group GR2 is held by a second lens group holder HR2. The second lens group holder HR2 is fitted to the second lens group holder guide groove j3 and to the second lens group motor G2M.

Specifically, the second lens group holder HR2 has, formed at one end thereof, a claw (second lens group claw j4) that fits in the second lens group holder guide groove j3, and has, provided at the other end thereof, a rack (second lens group holder rack) that engages with the rotary shaft G2MS of the second lens group motor G2M. The second lens group holder rack HR2R has, formed thereon, a threaded portion (unillustrated) that meshes with a lead screw (unillustrated) formed on the rotary shaft G2MS.

Thus, the lead screw on the rotary shaft G2MS engages (for example, meshes) with the threaded portion on the second lens group holder rack HR2R. This permits the driving force of the second lens group motor G2M to be transmitted to the second lens group holder rack HR2R, and hence to the second lens group holder HR2. Thus, the second lens group holder HR2 (and hence the second lens group GR2) is movable along the second lens group holder guide groove j3 and the rotary shaft G2MS.

2-2-3. Rested State and Movement Mechanism of the First Lens Group

As shown in FIG. 3, the first lens group (most object-side lens group) GR1 is held by a first lens group holder HR1. The first lens group holder HR1 is fitted in an object-side end portion of the movable barrel MB. As described above, via the movement barrel claw j2 that fits in the movable barrel guide groove j1 of the fixed barrel FB, the movable barrel MB is movable back and forth along the direction of the barrel axis. Moreover, the movable barrel MB has, provided in the inner wall thereof, a rack (movable barrel rack) MBR that engages with the rotary shaft G1MS of the first lens group motor G1M. The movable barrel rack MBR has, formed thereon, a threaded portion (unillustrated) that meshes with a lead screw (unillustrated) formed on the rotary shaft G1MS.

Thus, the lead screw on the rotary shaft G1MS engages with the threaded portion on the movable barrel rack MBR. This permits the driving force of the first lens group motor G1M to be transmitted to the movable barrel rack MBR, and hence to the movable barrel MB and to the first lens group holder HR1. Thus, the first lens group holder HR1 (and hence the first lens group GR1) is movable back and forth along the movable barrel guide groove j1 and the rotary shaft G1MS.

2-2-4. Rested State and Movement Mechanism of the Third Lens Group

As shown in FIGS. 2 and 3, the third lens group GR3 is held by a third lens group holder HR3. The third lens group holder HR3 is fitted to the third lens group guide shaft G3G (see FIG. 2) and to the third lens group motor G3M (see FIG. 3).

Specifically, the third lens group holder HR3 has, formed at one end thereof, an opening (third lens group opening, see FIG. 2) HR3H through which the third lens group guide shaft G3G is put, and has, provided at the other end thereof, a rack (third lens group holder rack, see FIG. 3) HR3R that engages with the rotary shaft G3MS of the third lens group motor G3M. The third lens group holder rack HR3R has, formed thereon, a threaded portion (unillustrated) that meshes with a lead screw formed on the rotary shaft G3MS.

Thus, the lead screw on the rotary shaft G3MS engages with the threaded portion on the third lens group holder rack HR3R. This permits the driving force of the third lens group motor G3M to be transmitted to the third lens group holder rack HR3R, and hence to the third lens group holder HR3. Thus, the third lens group holder HR3 (and hence the third lens group GR3) is movable back and forth along the rotary shaft G3MS and the third lens group guide shaft G3G.

2-2-5. Rested State and Movement Mechanism of the Fourth Lens Group

As shown in FIG. 4, the fourth lens group GR4 is held by a fourth lens group holder HR4. The fourth lens group holder HR4 is fitted to the fourth lens group guide shaft G4G and to the fourth lens group motor G4M.

Specifically, the fourth lens group holder HR4 has, formed at one end thereof, an opening (fourth lens group opening) HR4H through which the fourth lens group guide shaft G4G is put, and has, provided at the other end thereof, a rack (fourth lens group holder rack) HR4R that engages with the rotary shaft G4MS of the fourth lens group motor G4M. Moreover, the fourth lens group holder rack HR4R has, formed thereon, a threaded portion (unillustrated) that meshes with a lead screw (unillustrated) formed on the rotary shaft G4MS.

Thus, the lead screw on the rotary shaft G4MS meshes with the threaded portion on the fourth lens group holder rack HR4R. This permits the driving force of the fourth lens group motor G4M to be transmitted to the fourth lens group holder rack HR4R, and hence to the fourth lens group holder HR4. Thus, the fourth lens group holder HR4 (and hence the fourth lens group GR4) is movable back and forth along the rotary shaft G4MS and the fourth lens group guide shaft G4G.

2-3. Details of the Lens Unit

Now, the details of the lens unit LU composed of the variable-magnification optical system OS and the image sensor SR will be described with reference to FIGS. 5 to 12 (for the sake of convenience, the image sensor SR is omitted in FIGS. 5 and 6). As described previously, the DSC 29 is capable of both moving picture shooting and still picture shooting. The state of the lens unit LU in moving picture shooting is shown in FIG. 5, and the state of the lens unit LU in still picture shooting is shown in FIG. 6. The aberration diagrams of the lens unit LU in moving picture shooting are shown in FIGS. 7A to 7C, 8A to 8C, and 9A to 9C, and the aberration diagrams of the lens unit LU in still picture shooting are shown in FIGS. 10A to 10C, 11A to 11C, and 12A to 12C (of these diagrams, a detailed description will be given later).

In FIGS. 5 and 6, a symbol in the form of "GRi" represents a lens group, a symbol in the form of "Li" represents a lens element, and a symbol in the form of "si" represents a lens surface. The number "i" suffixed to any such symbol represents the order as counted from object side to image side. An aspherical surface is marked with an asterisk "*".

A symbol in the form of "di" represents an axial distance, and illustrated are only those which vary during zooming, that is, only the group-to-group axial distances. An arrow "MMi" schematically indicates the movement trail traveled by the relevant lens group during zooming from the wide-angle end W to the middle-focal-length position M and then from the middle-focal-length position M to the telephoto end T. The number "i" suffixed to a symbol "MMi" indicates the order from object side to the image side, and thus corresponds to the order of the relevant lens group. The lens unit LU shown in FIGS. 5 and 6 will be referred to as that of the first embodiment.

2-3-1. Construction of the Lens Unit of the First Embodiment

The lens unit LU includes, from the shooting object side, a first lens group GR1, a second lens group GR2, a third lens group GR3, a fourth lens group GR4, a fifth lens group GR5, and an image sensor SR.

2-3-1-1. First Lens Group

The first lens group GR1 includes, from the object side, a first lens element L1, a second lens element L2, and a third lens element L3. The first lens group GR1 as a whole has a "positive" optical power (refractive power). It should be noted that an optical power is a quantity expressed as the reciprocal of a focal length.

Used as these lens elements are:
The first lens element L1: a negative meniscus lens element convex to the object side;
The second lens element L2: a biconvex positive lens element; and
The third lens element L3: a positive meniscus lens element convex to the object side.

Here first and second lens elements L1 and L2 are cemented together at the surface s2 to form a cemented lens element. The cementing together of the lens elements is achieved by the use of adhesive or the like. It should be noted that any cemented lens element mentioned later is formed likewise, that is, by cementing together lens elements with adhesive or the like.

2-3-1-2. Second Lens Group

The second lens group GR2 includes, from the object side, a fourth lens element L4, a fifth lens element L5, and a sixth lens element L6. The second lens group GR2 as a whole has a "negative" optical power.

Used as these lens elements are:
The fourth lens element L4: a negative meniscus lens element convex to the object side (and having an aspherical surface at the surface s6);
The fifth lens element L5: a biconcave negative lens element; and
The sixth lens element L6: a positive meniscus lens element convex to the object side.

Here, the fifth and sixth lens elements L5 and L6 are cemented together at the surface s9 to form a cemented lens element. It should be noted that an aspherical surface is a refractive optical surface having an aspherical shape, a surface that exerts a refractive effect equivalent to that exerted by an aspherical surface, or the like.

2-3-1-3. Third Lens Group

The third lens group GR3 includes, from the object side, an optical aperture stop ST, a seventh lens element L7, an eighth lens element L8, a ninth lens element L9, a tenth lens element L10, and an eleventh lens element L11. The third lens group GR3 as a whole has a "positive" optical power.

Used as these lens elements etc. are:
The optical aperture stop ST: an aperture stop that intercepts part of the light that has passed through the first and second lens groups GR1 and GR2; identified also with the symbol s11; and built integrally with the third lens group GR3;
The seventh lens element L7: a positive meniscus lens element convex to the object side;
The eighth lens element L8: a negative meniscus lens element convex to the object side (and having an aspherical surface at the surface s14);
The ninth lens element L9: a negative meniscus lens element convex to the object side;
The tenth lens element L10: a biconvex positive lens element; and
The eleventh lens element L11: a negative meniscus lens element concave to the object side (and having aspherical surfaces at the surfaces s19 and s20).

Here, the ninth and tenth lens elements L9 and L10 are cemented together at the surface s17 to form a cemented lens element.

2-3-1-4. Fourth Lens Group

The fourth lens group GR4 includes, from the object side, a twelfth lens element L12 and a thirteenth lens element L13. The fourth lens group GR4 as a whole has a "positive" optical power.

Used as these lens elements are:
The twelfth lens element L12: a biconvex positive lens element; and
The thirteenth lens element L13: a negative meniscus lens element concave to the object side.

Here, the twelfth and thirteenth lens elements L12 and L13 are cemented together at the surface s22 to form a cemented lens element.

2-3-1-5. Fifth Lens Group

The fifth lens group GR5 includes, from the object side, a fourteenth lens element L14 and an IR cut filter PT. The fifth lens group GR5 as a whole has a "positive" optical power. As described previously, the fifth lens group GR5 remains stationary during zooming.

Used as these lens elements etc. are:
The fourteenth lens element L14: a positive meniscus lens element concave to the object side (and having aspherical surfaces at the surfaces s24 and s25; and
The IR cut filter PT: a plane-parallel plate having two surfaces s26 and s27; absorbs infrared rays.

2-3-2. Construction Data of the Variable-Magnification Optical System (First Embodiment)

Next, the construction data of the variable-magnification optical system OS provided in the lens unit LU of the first embodiment will be described with reference to Tables 1 and 2.

In Table 1, a symbol in the form of "ri" represents the radius of curvature (in mm) of the surface si. An aspherical surface is marked with an asterisk "*". A symbol in the form of "di" represents the axial distance (in mm) between the ith surface si and the (i+1)th surface s(i+1). For any axial distance di that varies with zooming (that is, for any group-to-group distance), three values thereof are listed, which are, from left, the value observed at the wide-angle end W, the value observed at the middle-focal-length position M, and the value observed at telephoto end T.

In the lens unit LU of this embodiment, the lens groups move in different ways between in moving picture shooting and in still picture shooting. For this reason, wherever distinction is necessary, axial distances observed in moving picture shooting are indicated as "MV", and axial distances observed in still picture shooting are indicated as "SE".

The symbols in the form of "Ni" and "vi" represents the refractive index (Nd) and the Abbe number (vd) of the medium that fills the axial distance di. Here, the refractive index (Nd) and the Abbe number (vd) are for the d-line (with an wavelength of 587.56 nm).

Used as representatives of different "focal length positions" are the telephoto end (shortest-focal-length position) W, the middle-focal-length position M, and the wide-angle end (longest-focal-length position) T. The symbols "f" and "FNO" represents the focal lengths (in mm) and the f-numbers of the entire optical system as observed at the just mentioned different focal positions W, M, and T. Wherever distinction is necessary, values observed in moving picture shooting are indicated as "MV", and values observed in still picture shooting are indicated as "SE".

An aspherical surface is defined by formula (AS) below.

$$X(H) = C_0 \cdot H^2 / (1 + \sqrt{1 - \epsilon \cdot C_0^2 \cdot H^2}) + \Sigma A_j \cdot H^j \quad (AS)$$

where
H represents the height in the direction perpendicular to the optical axis AX;
X(H) represents the displacement (sag) in the optical axis AX direction at the height H;
$C_0$ represents the paraxial curvature (=1/ri);
$\epsilon$ represents the quadric surface parameter;
j represents the order of the aspherical surface; and
Aj represents the aspherical surface coefficient of order j.

The data relating to aspherical surfaces (aspherical surface data) are shown in Table 2. Here, any term whose coefficient equals zero is omitted, and, for all data, "E-n" stands for "$\times 10^{-n}$".

3. Zooming by the DSC

Now, a description will be given of how the DSC 29, incorporating the variable-magnification optical system OS including the movable lens groups GR1 to GR4, performs zooming. The zooming is controlled by the control section 21. For example, the control section 21 performs zooming to cope with light incoming at different angles of view while referring to a data table stored in the RAM 23 or the like.

The data table contains, for example, the following relationships:

(a) The relationship between the driving pulse count values of the individual stepping motors G1M to G4M and the movement distances of the individual lens groups GR1 to GR4;

(b) The relationship between the movement distances of the individual lens groups GR1 to GR4 and the positions of the individual lens groups GR1 to GR5 (the positions where they are currently at rest) as found from those movement distances and the initial positions;

(c) The relationship between the positions of the individual lens groups GR1 to GR5 and the focal length of the variable-magnification optical system OS (the entire optical system) as found from those positions; and (d) The relationship between the focal length of the entire optical system and the angle of view as found from that focal length and the prescribed size (image height etc.) of the image-sensing area of the image sensor SR.

Since the DSC 29 of this embodiment is designed to be capable of both moving picture shooting and still picture shooting, it performs zooming in a manner that suits the type of shooting (moving picture shooting or still picture shooting) currently being performed. For example, the DSC 29 contains different data tables for different types of shooting, namely one (moving picture shooting data table) for moving picture shooting and another (still picture shooting data table) for still picture shooting, and performs zooming according to those data tables.

Now, the movement of the lens groups GR1 to GR5 of the variable-magnification optical system OS during zooming in moving picture shooting and still picture shooting will be described with reference to FIGS. 13A to 13G and 14A to 14G. FIGS. 13A to 13G show different states of the lens barrel LB in moving picture shooting, and FIGS. 14A to 14G show different states of the lens barrel LB in still picture shooting. Like FIG. 2, FIGS. 13A to 13G and 14A to 14G are all sectional views schematically showing, in particular, how the second and fifth lens groups GR2 and GR5 are rested. It should be noted that the image height (Y') on the image-sensing surface of the image sensor SR is 1.5 mm in moving picture shooting and 3.6 mm in still picture shooting.

Of all the diagrams shown in FIGS. 13A to 13G and 14A to 14G, the one at the top of each page shows the state observed when the variable-magnification optical system OS is at the wide-angle end W, the one at the bottom of each page shows the state observed when the variable-magnification optical system OS is at the telephoto end T, and the others in between show the states observed when the variable-magnification optical system OS is at arbitrary positions (at arbitrary magnifications) between the wide-angle end W and the telephoto end T. For the sake of convenience, the individual diagrams on each page are referred to as FIGS. 13A to 13G (or FIGS. 14A to 14G) from top to bottom. Also for the sake of convenience, in these diagrams, only the lens groups GR1 to GR5 of the variable-magnification optical system OS are shown; for the other components thereof that are omitted here, see FIG. 2.

3-1. Behavior of the Variable-Magnification Optical System in Moving Picture Shooting The DSC 29 of this embodiment starts its operation when the on/off button 14a is operated (see FIG. 1). Thereafter, when the mode select button 14d is so operated as to start moving picture shooting, the control section 21 refers to the moving picture shooting data table, and makes the variable-magnification optical system OS ready for zooming. Then, according to how the zoom key 14e is operated, the variable-magnification optical system OS is zoomed. FIGS. 13A to 13G show the movement of the lens groups GR1 to GR5 (the change in the lens barrel LB) of the variable-magnification optical system OS during this zooming.

Figure 13A:
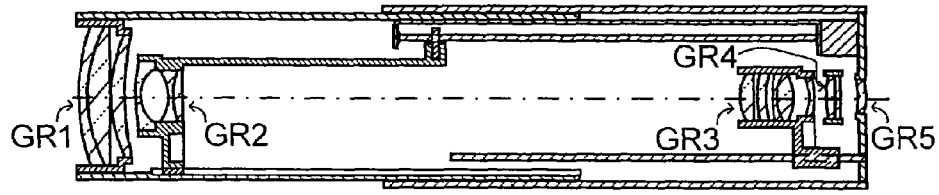
FIG. 13A is a sectional view schematically showing the lens barrel, in a state when zoomed to the wide-angle end in moving picture shooting.
Figure 13B:
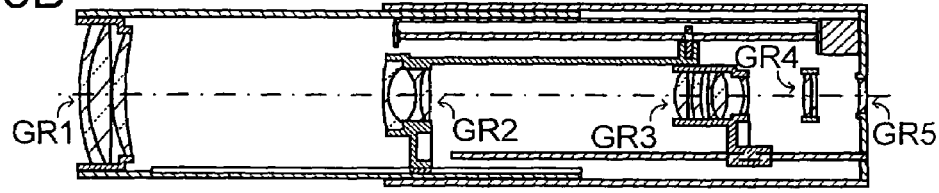
FIG. 13B is a sectional view schematically showing the lens barrel, in a state when zoomed to an arbitrary position between the wide-angle and telephoto ends in moving picture shooting.
Figure 13C:
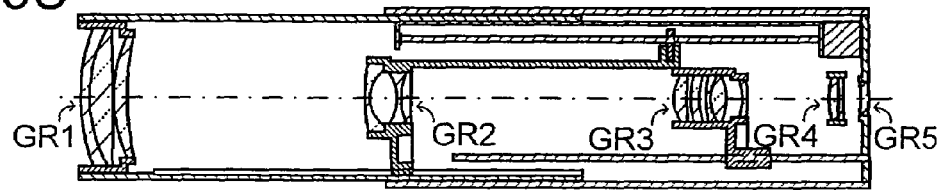
FIG. 13C is a sectional view schematically showing the lens barrel, in a state when zoomed to an arbitrary position other than that shown in FIG. 13B between the wide-angle and telephoto ends in moving picture shooting.
Figure 13D:
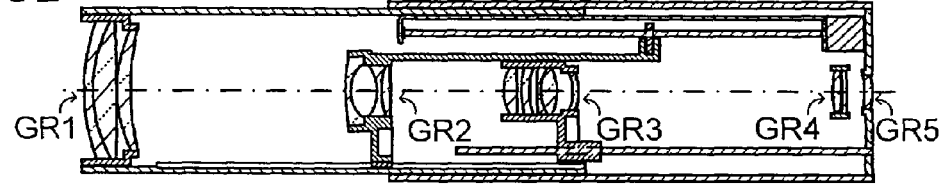
FIG. 13D is a sectional view schematically showing the lens barrel, in a state when zoomed to an arbitrary position other than those shown in FIGS. 13B and 13C between the wide-angle and telephoto ends in moving picture shooting.
Figure 13E:
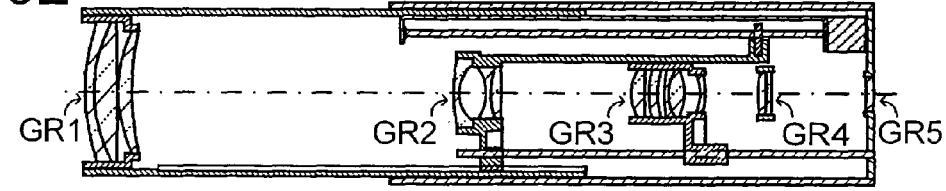
FIG. 13E is a sectional view schematically showing the lens barrel, in a state when zoomed to an arbitrary position other than those shown in FIGS. 13B to 13D between the wide-angle and telephoto ends in moving picture shooting.
Figure 13F:
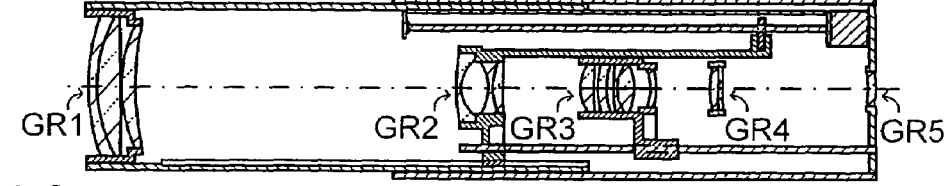
FIG. 13F is a sectional view schematically showing the lens barrel, in a state when zoomed to an arbitrary position other than those shown in FIGS. 13B to 13E between the wide-angle and telephoto ends in moving picture shooting.
Figure 13G:
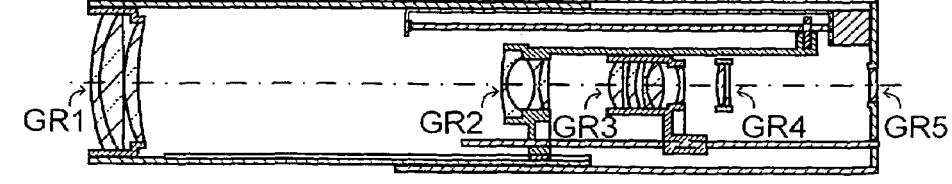
FIG. 13G is a sectional view schematically showing the lens barrel, in a state when zoomed to the telephoto end in moving picture shooting.
Figure 14A:
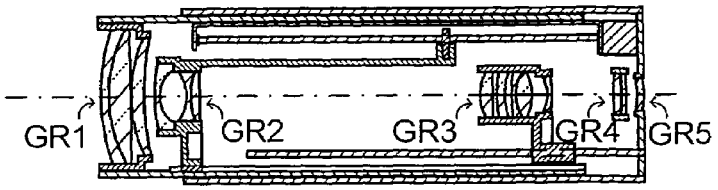
FIG. 14A is a sectional view schematically showing the lens barrel, in a state when zoomed to the wide-angle end in still picture shooting.
Figure 14B:
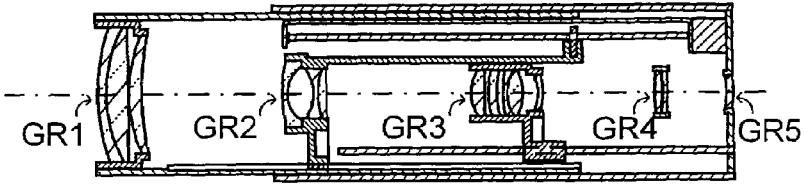
FIG. 14B is a sectional view schematically showing the lens barrel, in a state when zoomed to an arbitrary position between the wide-angle and telephoto ends in still picture shooting.
Figure 14C:
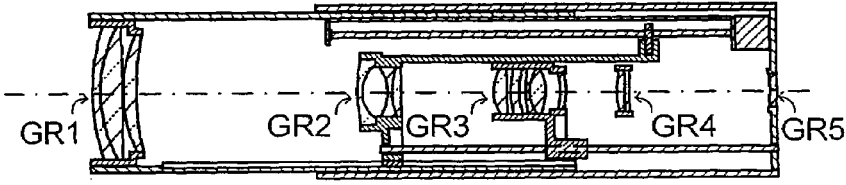
FIG. 14C is a sectional view schematically showing the lens barrel, in a state when zoomed to an arbitrary position other than that shown in FIG. 14B between the wide-angle and telephoto ends in still picture shooting.
Figure 14D:
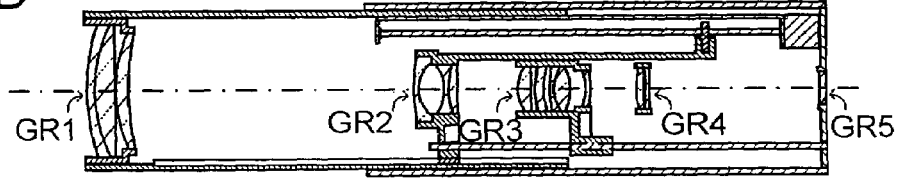
FIG. 14D is a sectional view schematically showing the lens barrel, in a state when zoomed to an arbitrary position other than those shown in FIGS. 14B and 14C between the wide-angle and telephoto ends in still picture shooting.
Figure 14E:
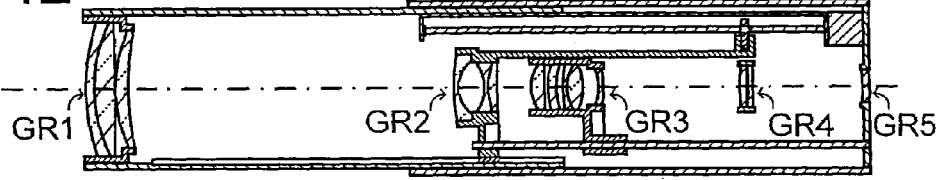
FIG. 14E is a sectional view schematically showing the lens barrel, in a state when zoomed to an arbitrary position other than those shown in FIGS. 14B to 14D between the wide-angle and telephoto ends in still picture shooting.
Figure 14F:
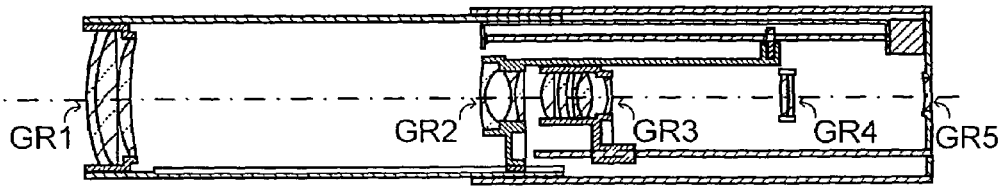
FIG. 14F is a sectional view schematically showing the lens barrel, in a state when zoomed to an arbitrary position other than those shown in FIGS. 14B to 14E between the wide-angle and telephoto ends in still picture shooting.
Figure 14G:
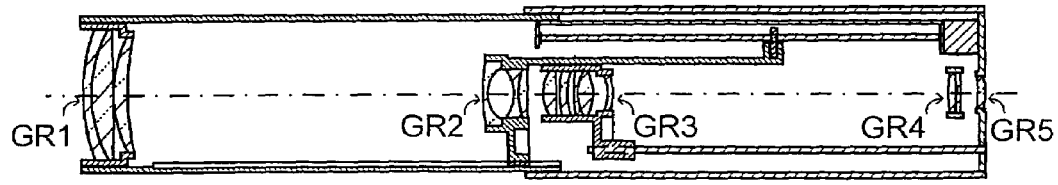
FIG. 14G is a sectional view schematically showing the lens barrel, in a state when zoomed to the telephoto end in still picture shooting.

The group-to-group distances (in mm) observed in the different states shown in FIGS. 13A to 13G and the total length (in mm) of the variable-magnification optical system OS are shown in Table 3. The total length in Table 3 is the distance from the first lens group GR1 to the IR cut filter PT. Since FIG. 13A shows the state of the variable-magnification optical system OS at the wide-angle end W (the first angle of view), and FIG. 13G shows the state of the variable-magnification optical system OS at the telephoto end T (the second angle of view), the corresponding values in Table 3 are indicated as such.

As shown in FIGS. 13A to 13G, during magnification variation in moving picture shooting, the first lens group GR1 (stationary lens group) remains stationary at a predetermined position (zoom start position). Thus, as shown in Table 3, the total length of the variable-magnification optical system OS remains fixed. On the other hand, the second to fourth lens groups (movable lens groups) move to and then rest at respective positions that correspond to a given magnification. Thus, as shown in Table 3, the group-to-group distances (GR1-GR2, GR2-GR3, GR3-GR4, and GR4-GR5) vary with the magnification.

Thus, in the DSC 29 of this embodiment, in moving picture shooting, the following steps are performed: a step (first movement step) of moving at least one (for example, the first lens group GR1) of the plurality of lens groups GR1 to GR5 to the zoom start position (predetermined position) irrespective of the magnification; and a step (second movement step) of moving at least one (for example, the second to fourth lens groups GR2 to GR4) of the lens groups other than the one moved in the previous step to a position corresponding to a given magnification.

The zoom start position is located between the position (first position) of the first lens group GR1 at the wide-angle end W and the position (second position) thereof at the telephoto end T as observed during zooming in still picture shooting, which will be described later.

Now, the movement of the individual lens groups GR1 to GR5 will be described in more detail with reference to the movement trails MM1 to MM5 shown in FIG. 5. As shown in FIG. 5, during zooming (from the wide-angle end W to the telephoto end T) in moving picture shooting, the first lens group GR1 remains stationary at the zoom start position (predetermined position) (and the fifth lens group GR5 is fixed at a predetermined position). Thus, as shown in Table 3, the total length of the variable-magnification optical system OS remains constant (fixed) during zooming.

On the other hand, as shown in FIGS. 13A to 13G, the second to fourth lens groups GR2 to GR4 move to and then rest at respective positions that correspond to a given magnification. Thus, as shown in Table 3, the group-to-group distances (GR1-GR2, GR2-GR3, GR3-GR4, and GR4-GR5) vary with the magnification.

Figure 7A:
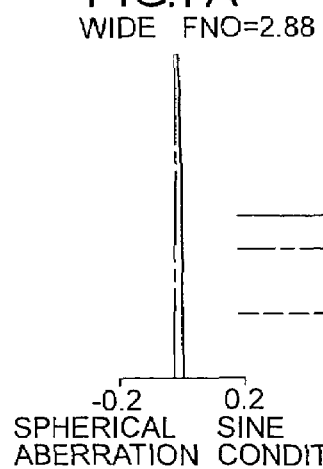
FIG. 7A is a spherical aberration diagram of the lens unit (the first embodiment), as observed when it is zoomed to the wide-angle end W in moving picture shooting.
Figure 7B:
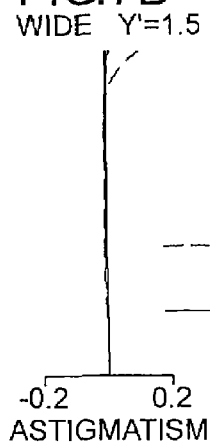
FIG. 7B is an astigmatism diagram of the lens unit (the first embodiment), as observed when it is zoomed to the wide-angle end W in moving picture shooting.
Figure 7C:
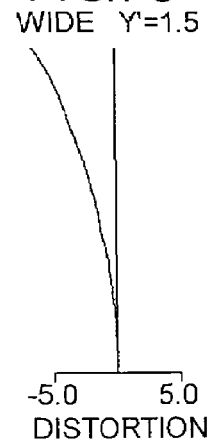
FIG. 7C is a distortion diagram of the lens unit (the first embodiment), as observed when it is zoomed to the wide-angle end W in moving picture shooting.
Figure 8A:
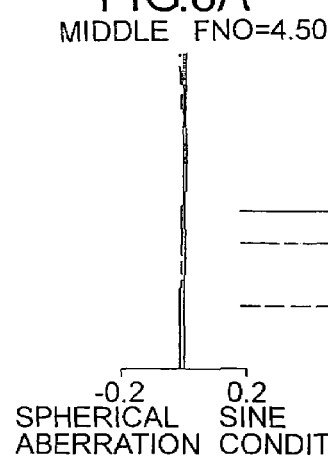
FIG. 8A is a spherical aberration diagram of the lens unit (the first embodiment), as observed when it is zoomed to the middle-focal-length position M in moving picture shooting.
Figure 8B:
FIG. 8B is an astigmatism diagram of the lens unit (the first embodiment), as observed when it is zoomed to the middle-focal-length position M in moving picture shooting.
Figure 8C:
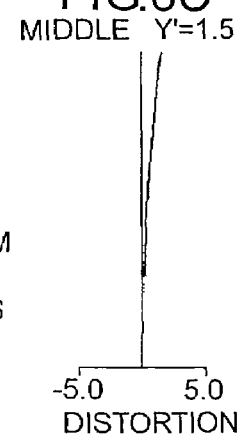
FIG. 8C is a distortion diagram of the lens unit (the first embodiment), as observed when it is zoomed to the middle-focal-length position M in moving picture shooting.
Figure 9A:
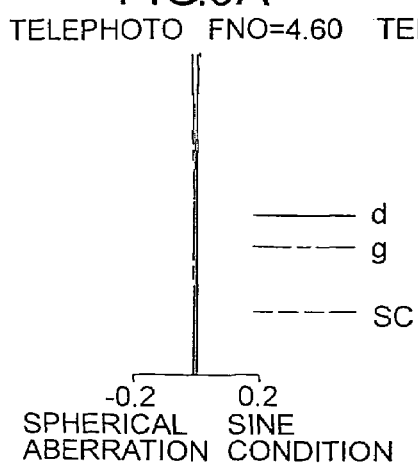
FIG. 9A is a spherical aberration diagram of the lens unit (the first embodiment), as observed when it is zoomed to the telephoto end T in moving picture shooting.
Figure 9B:
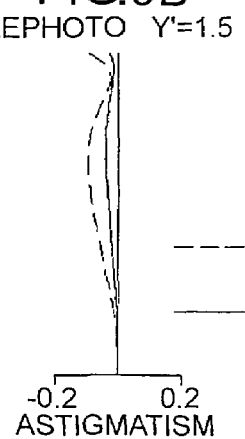
FIG. 9B is an astigmatism diagram of the lens unit (the first embodiment), as observed when it is zoomed to the telephoto end T in moving picture shooting.
Figure 9C:
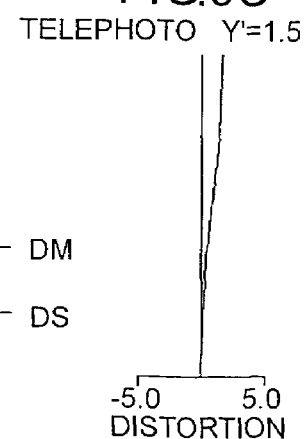
FIG. 9C is a distortion diagram of the lens unit (the first embodiment), as observed when it is zoomed to the telephoto end T in moving picture shooting.

FIGS. 7A to 7C, 8A to 8C, and 9A to 9C show the aberrations observed in the variable-magnification optical system OS during zooming in moving picture shooting. Specifically, FIGS. 7A to 7C show the aberrations observed at the wide-angle end W, FIGS. 8A to 8C show the aberrations observed at the middle-focal-length position M, and FIGS. 9A to 9C show the aberrations observed at the telephoto end T.

FIGS. 7A, 8A, and 9A show spherical aberration (S.A.) and sine condition (S.C.). In these diagrams, a solid line "d" represents the spherical aberration (in mm) for the d-line, a dash-and-dot line "g" represents the spherical aberration (in mm) for the g-line (with a wavelength of 435.8 nm), and a broken line "SC" represents the deviation (in mm) from the ideal sine condition. Shown together with each of these diagrams is the f-number FNO.

FIGS. 7B, 8B, and 9B show astigmatism. In these diagrams, a broken line "DM" represent the astigmatism (in mm) observed on the meridional plane, and a solid line "DS" represent the astigmatism (in mm) observed on the sagittal plane. Shown together with each of these diagrams is the maximum image height Y' (in mm) on the image-sensing surface of the image sensor SR.

FIGS. 7C, 8C, and 9C show distortion. In these diagrams, a solid line represents the distortion (in percentage) for the d-line. Shown also together with each of these diagrams is the maximum image height Y'.

3-2. Behavior of the Variable-Magnification Optical System in Still Picture Shooting On the other hand, when the mode select button 14*d* is so operated as to start still picture shooting, the control section 21 refers to the still picture shooting data table, and makes the variable-magnification optical system OS ready for zooming (see FIG. 1). Then, according to how the zoom key 14*e* is operated, the variable-magnification optical system OS is zoomed. FIGS. 14A to 14G show the movement of the lens groups GR1 to GR5 (the change in the lens barrel LB) of the variable-magnification optical system OS during this zooming.

The group-to-group distances (in mm) observed in the different states shown in FIGS. 14A to 14G and the total length (in mm) of the variable-magnification optical system OS are shown in Table 4. In Table 4, the same conventions as used in Table 3 are used.

As shown in FIGS. 14A to 14G, during magnification variation in still picture shooting, the first to fourth lens groups GR1 to GR4 move to and then rest at respective positions that correspond to a given magnification. Thus, as shown in Table 4, the group-to-group distances (GR1-GR2, GR2-GR3, GR3-GR4, and GR4-GR5) and the total length of the variable-magnification optical system OS vary with the magnification. In particular, the total length of the variable-magnification optical system OS increases toward the telephoto end T.

Thus, in the DSC 29 of this embodiment, in still picture shooting, the following step is performed: a step (third movement step) of moving a plurality of lens groups including the first lens group GR1 (for example, the first to fourth lens groups GR1 to GR4) to positions corresponding to a given magnification.

Now, the movement of the individual lens groups GR1 to GR5 will be described in more detail with reference to the movement trails MM1 to MM5 shown in FIG. 6. As shown in FIG. 6, during zooming (from the wide-angle end W to the telephoto end T) in still picture shooting, the first lens group GR1 does not rest at the zoom start position, but moves toward the object side according to the magnification. The fifth lens group GR5, however, is fixed at a predetermined position. Thus, as shown in Table 4, the total length of the variable-magnification optical system OS varies with zooming. Specifically, as zooming is performed from the wide-angle end W toward the telephoto end T, the total length of the variable-magnification optical system OS increases.

Moreover, as shown in FIGS. 14A to 14G, as during zooming in moving picture shooting, the second to fourth lens groups GR2 to GR4 move to and then rest at respective positions that correspond to a given magnification. Thus, as shown in Table 4, as during zooming in moving picture shooting, the group-to-group distances (GR1-GR2, GR2-GR3, GR3-GR4, and GR4-GR5) vary with the magnification.

FIGS. 10A to 10C, 11A to 11C, and 12A to 12C show the aberrations observed in the variable-magnification optical system OS during zooming in still picture shooting. In FIGS. 10A to 10C, 11A to 11C, and 12A to 12C, the same conventions as used in FIGS. 7A to 7C, 8A to 8C, and 9A to 9C are used.

4. Zooming Control by the DSC at Switching Between Different Types of Shooting

In the DSC 29 of this embodiment, when the mode select button 14*d* is operated, the type of shooting that is performed is switched (between moving picture shooting (moving picture shooting mode) and still picture shooting (still picture shooting mode)).

Thus, in the DSC 29, in the middle of still picture shooting at an arbitrary magnification, switching may be performed to moving picture shooting, and, in the middle of moving picture shooting at an arbitrary magnification, switching may be performed to still picture shooting. Now, with reference to the schematic configuration diagram in FIG. 1 and the flow charts in FIGS. 15 and 16, how the lens groups are moved when such switching is performed will be described. In the flow charts, each step is identified by "S" followed by a unique number.

Figure 15:
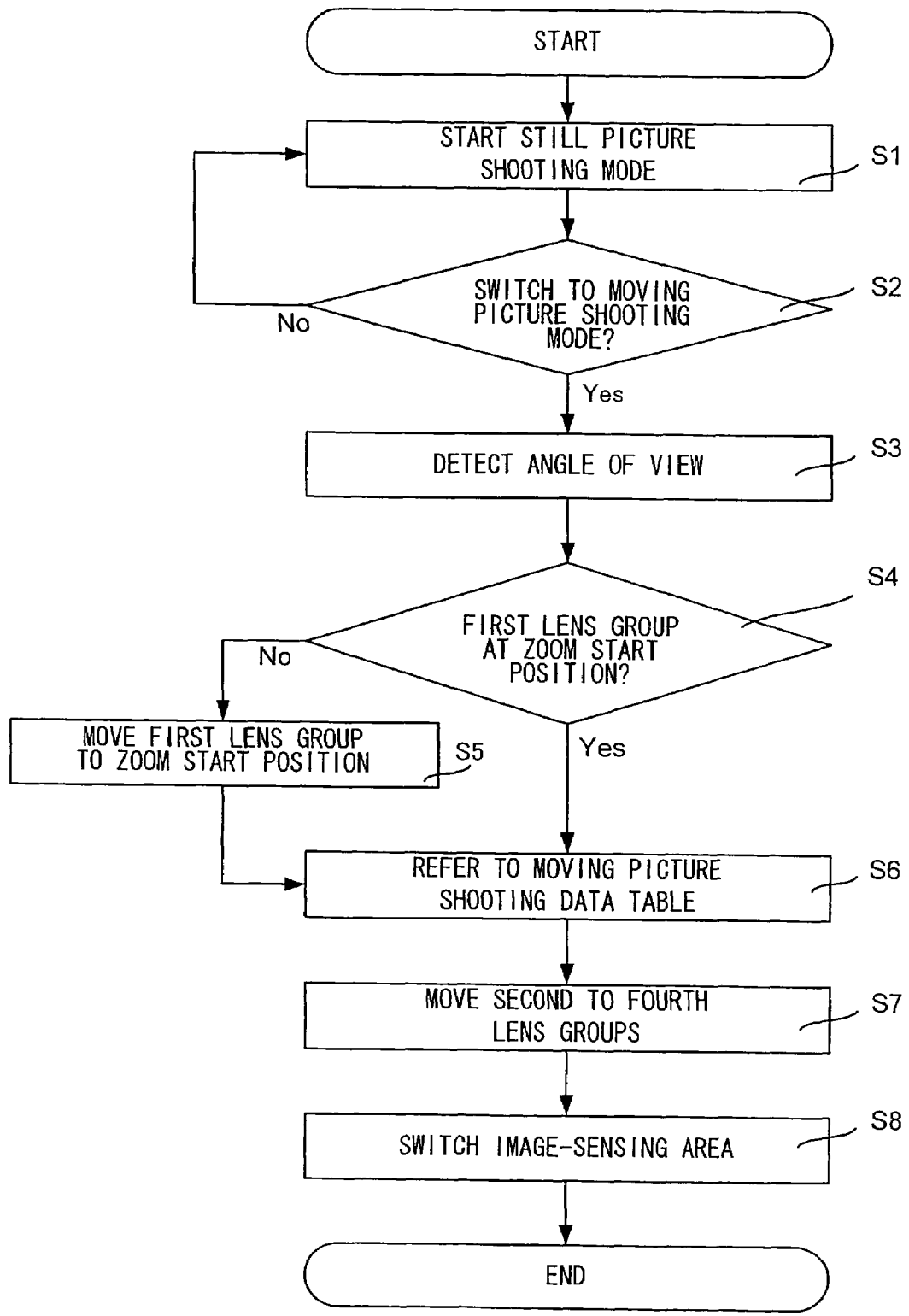
FIG. 15 is a flow chart showing how the lens groups are moved when switching is performed from still picture shooting to moving picture shooting.

4-1. Switching from Still Picture Shooting at an Arbitrary Magnification to Moving Picture Shooting FIG. 15 is a flow chart showing the sequence of steps performed when, in still picture shooting at an arbitrary magnification, switching to moving picture shooting is performed. As shown in this flow chart, the control section 21 of the DSC 29 maintains the state ready for still picture shooting (still picture shooting mode) (S1). When, for example, the user operates the mode select button 14*d*, the control section 21 performs switching from still picture shooting mode to moving picture shooting mode (the state ready for moving picture shooting) (S2, the switching step).

After this switching, the control section 21 refers to the driving pulse count values of the stepping motors G1M to G4M immediately before the switching and to the still picture shooting data table, and thereby detects the angle of view of the light that can be acquired by the variable-magnification optical system OS at the time of the switching (S3).

Then, the control section 21 refers to the driving pulse count value of the first lens group motor G1M immediately before the switching and to the still picture shooting data table, and thereby detects the position of the first lens group GR1. The control section 21 then checks whether or not the detected position of the first lens group GR1 coincides with the prescribed zoom start position (S4).

If the result of this checking (S4) is that the position of the first lens group GR1 does not coincides with the zoom start position ("No" in S4), the control section 21 moves the first lens group GR1 to the zoom start position by using the first lens group motor G1M (S5).

Thereafter, the control section 21 refers to the moving picture shooting data table to find the angle of view that corresponds to the angle of view detected in S3 (S6). Then, according to the driving pulse count values of the second to fourth lens group motors G2M to G4M that correspond to the angle of view found in the moving picture shooting data table, the control section 21 makes the second to fourth lens groups GR2 to GR4 move (S7, the angle-of-view maintaining step). Approximately at the same time, the control section 21 switches the image-sensing area of the image sensor SR to the one corresponding to moving picture shooting (S8).

In this way, in the DSC 29 of the embodiment, even when switching is performed from still picture shooting to moving picture shooting (when switching is performed in the switching step), the angle of view of the light acquired through zooming before the switching approximately coincides with the angle of view of the light acquired through zooming after the switching (the angle of view does not change through the angle-of-view maintaining step). If, in step S4, the position of the first lens group GR1 approximately coincides with the zoom start position ("Yes" in S4), the operation flow proceeds directly from S4 to S5.

Figure 16:
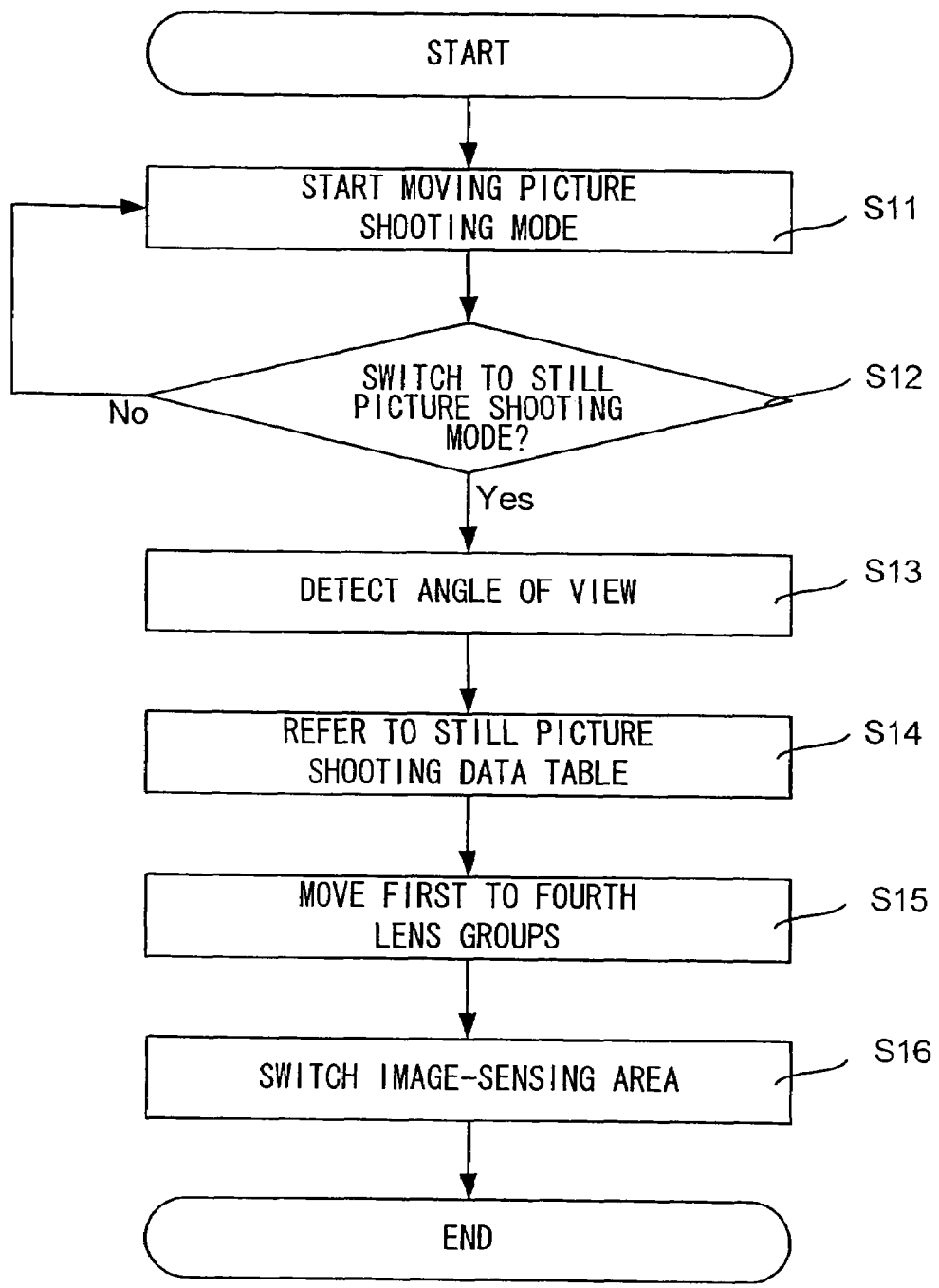
FIG. 16 is a flow chart showing how the lens groups are moved when switching is performed from moving picture shooting to still picture shooting.

4-2. Switching from Moving Picture Shooting at an Arbitrary Magnification to Still Picture Shooting Next, what happens when switching from moving picture shooting at an arbitrary magnification to still picture shooting is performed will be described. FIG. 16 is a flow chart showing the sequence of steps performed when, in moving picture shooting at an arbitrary magnification, switching to still picture shooting is performed. As shown in this flow chart, the control section 21 of the DSC 29 maintains the state ready for moving picture shooting (moving picture shooting mode) (S11). When, for example, the user operates the mode select button 14d, the control section 21 performs switching from moving picture shooting mode to still picture shooting mode (the state ready for still picture shooting) (S12, the switching step).

After this switching, the control section 21 refers to the driving pulse count values of the stepping motors G1M to G4M immediately before the switching and to the still picture shooting data table, and thereby detects the angle of view of the light that can be acquired by the variable-magnification optical system OS at the time of the switching (S13).

Then, the control section 21 refers to the still picture shooting data table to find the angle of view that corresponds to the angle of view detected in S13 (S14). Then, according to the driving pulse count values of the first to fourth lens group motors G1M to G4M that correspond to the angle of view found in the still picture shooting data table, the control section 21 makes the lens groups GR1 to GR4 move (S15, the angle-of-view maintaining step). Approximately at the same time, the control section 21 switches the image-sensing area of the image sensor SR to the one corresponding to still picture shooting (S16).

In this way, in the DSC 29 of the embodiment, even when switching is performed from moving picture shooting to still picture shooting, the angle of view of the light acquired through zooming before the switching approximately coincides with the angle of view of the light acquired through zooming after the switching (the angle of view does not change through the angle-of-view maintaining step).

5. Examples of Various Features of the First Embodiment

As described above, the DSC 29 of this embodiment includes a variable-magnification optical system OS and an image sensor SR that receives the light from a shooting object as captured by the variable-magnification optical system OS. The variable-magnification optical system OS includes a plurality of lens groups GR1 to GR5. These lens groups GR1 to GR5 include at least one lens group (for example, the lens groups GR1 to GR4) that is movable by means of a movement mechanism. Moreover, the DSC 29 can switch the image sensor SR between moving picture shooting and still picture shooting.

In the above-described DSC 29 of this embodiment, as shown in FIGS. 13A to 13G, 14A to 14G, 5, and 6, at least one of the movable lens groups travels different movement trails between during zooming in moving picture shooting and during zooming in still picture shooting.

For example, while the first lens group GR1 remains stationary during zooming in moving picture shooting, it moves toward the object side during zooming from the wide-angle end W to the telephoto end T in still picture shooting. Moreover, the movement trails of the second to fourth lens groups GR2 to GR4 of the variable-magnification optical system OS are also different between during zooming in moving picture shooting and during zooming in still picture shooting.

That is, in the DSC 29 of this embodiment, at least two lens groups (or at least three lens groups), specifically, the lens groups GR1 to GR4, are movable. Moreover, these movable lens groups GR1 to GR4 move differently between during zooming in moving picture shooting and during zooming in still picture shooting.

Thus, in the DSC 29 of this embodiment, zooming is performed based on different patterns of movement of the individual lens groups GR1 to GR4 that suit different shooting modes (moving picture shooting and still picture shooting).

Moreover, as described above, the first lens group GR1 remains stationary during zooming in moving picture shooting (magnification variation of the first type). On the other hand, the first lens group GR1 moves toward the object side during zooming from the wide-angle end W to the telephoto end T in still picture shooting (magnification variation of the second type). Thus, the total length of the variable-magnification optical system OS differs between in moving picture shooting and in still picture shooting.

For example, as shown in FIGS. 5 and 13A to 13G, when zooming is performed so as to capture light between at the wide-angle end (first angle of view) and at the telephoto end (second angle of view), the DSC 29 can keep the total length of the variable-magnification optical system OS constant during zooming in moving picture shooting. On the other hand, as shown in FIGS. 6 and 14A to 14G, the DSC 29 can vary the total length of the variable-magnification optical system OS during zooming in still picture shooting.

As the result of the first lens group GR1 being kept stationary during zooming in moving picture shooting as described above, the DSC 29 of this embodiment does not need to move the first lens group GR1, which is the most object-side lens group, for zooming. Thus, in the DSC 29 of this embodiment, the first lens group GR1 does not produce movement noise (zooming noise), which is undesirable during zooming in moving picture shooting. Thus, for example, in moving picture shooting, no zooming noise is recorded by the recording section (for example, RAM 23) within the DSC 29.

On the other hand, in the DSC 29 of this embodiment, during zooming in still picture shooting, the first lens group GR1 moves according to the magnification. For example, when the first lens group GR1 moves so as to capture light at the wide-angle end W or the like in still picture shooting, in the DSC 29 of this embodiment, the first lens group GR1 is moved out not so much (that is, as far as the zoom start position) as during zooming in moving picture shooting.

Thus, in the DSC 29 of this embodiment, the size of the first lens group GR1 (for example, the front element diameter thereof) is comparatively small. For example, as compared with the first lens group in a DSC (a conventional DSC of the type in which the first lens group always remains stationary)

in which zooming is performed by moving out the first lens group and then resting it at a given position in both moving picture shooting and still picture shooting, the first lens group GR1 of the DSC 29 of this embodiment is compact.

Moreover, unlike in a DSC of the type in which the first lens group always remains stationary, in the DSC 29 of this embodiment, during zooming in still picture shooting, the first lens group GR1 is movable during zooming in still picture shooting. Thus, even when the first lens group GR1 provided in the DSC 29 of this embodiment has the same size (for example, the same front element diameter) as the one provided in a DSC of the type in which the first lens group always remains stationary, the DSC 29 of this embodiment can realize shooting at higher magnification in still picture shooting than the DSC of the type in which the first lens group always remains stationary.

Thus, the DSC 29 of this embodiment, while offering high performance (for example, high magnification), boasts of a compact first lens group GR1. That is, it is possible to realize a high-performance, portable DSC 29. In addition, in the DSC 29 of this embodiment, during zooming in moving picture shooting, the first lens group GR1 remains stationary. Thus, the DSC 29 of this embodiment also overcomes the problem of zooming noise.

To effectively overcome the problem of zooming noise, the weights of the lens groups may be taken into consideration. Usually, the heavier a lens group, the heavier the burden on the stepping motor that drives it. As the burden increases, the driving noise (zooming noise) generated by the stepping motor increases.

Out of this consideration, in this embodiment, the heaviest (for example, the first lens group GR1) of the plurality of lens groups GR1 to GR5 remains stationary during zooming in moving picture shooting, and moves during zooming in still picture shooting.

With this design, the DSC 29 performs zooming in moving picture shooting by moving, not the heaviest lens group (for example, the first lens group GR1), but lighter lens groups (GR2 to GR4) other than the first lens group GR1. In this way, the DSC 29 of this embodiment reduces the driving noise of the first lens group motor G1M, which is the major cause of zooming noise.

In this embodiment, the number of lens groups is also taken into consideration. Usually, the larger the number of lens groups, the larger the number of zooming noise sources. Out of this consideration, in the DSC 29 of this embodiment, while the second to fourth lens groups GR2 to GR4 (three lens groups in total) are moved during zooming in moving picture shooting, the lens groups GR1 to GR4 (four lens groups in total) are moved during zooming in still picture shooting. With this design, the DSC 29 of this embodiment reduces the number of zooming noise sources.

The DSC 29 of this embodiment is capable of both moving picture shooting and still picture shooting. In a case where both moving picture shooting and still picture shooting capabilities are provided in this way, usually, while high performance (for example, high image quality and high resolution) is sought in still picture shooting, not so much in moving picture shooting.

Out of this consideration, in the DSC 29 of this embodiment, the image-sensing area ($Y'_{MV}$) of the image sensor SR that is used in moving picture shooting is made smaller than the image-sensing area ($Y'_{SE}$) of the image sensor SR that is used in still picture shooting ($Y'_{MV} < Y'_{SE}$).

With this design, the image sensor SR can be used in different ways that suit different types of shooting. For example, while, in still picture shooting, a comparatively wide area on the image-sensing surface of the image sensor SR is used to achieve high pixel number (high resolution), in moving picture shooting, a comparatively narrow area on the image-sensing surface of the image sensor SR is used to achieve low pixel number. Thus, the DSC 29 of this embodiment can acquire images that meet different requirements in different types of shooting. Moreover, in a case where low pixel number or the like is intended, the variable-magnification optical system OS does not need to be designed to offer unnecessarily high performance. This helps simplify the design and the like of the variable-magnification optical system OS.

The DSC 29 of this embodiment is provided with the mode select button 14d for switching between moving picture shooting and still picture shooting. When this mode select button 14d is operated to perform switching, the DSC 29 moves the lens groups GR1 to GR4 in such a manner as to keep the angle of view constant between during zooming before the switching and during zooming after the switching.

In general, the following relationship holds: (angle of view)=(image height)/(focal length). Hence, let the area on the image sensor SR that is used in moving picture shooting (as represented by the image height) be $Y'_{MV}$, and let the focal length of the entire optical system that is needed when the DSC 29 captures light at an angel of view of θ in moving picture shooting be $f_{MV}$, then the following relationship holds: θ=$Y'_{MV}/f_{MV}$. On the other hand, let the area on the image sensor SR that is used in still picture shooting be $Y'_{SE}$, and let the focal length of the entire optical system that is needed when the DSC 29 captures light at an angel of view of θ in still picture shooting be $f_{SE}$, then the following relationship holds: θ=$Y'_{SE}/f_{SE}$. Consequently, the following relationship holds: θ=$Y'_{MV}/f_{MV}=Y'_{SE}/f_{SE}$.

Thus, when switching is performed from moving picture shooting to still picture shooting, the DSC 29 of this embodiment can find, based on the already determined parameters, namely the image heights $Y'_{MV}$ and $Y'_{SE}$ and the angle of view θ and the focal length $f_{MV}$ in moving picture shooting, the $f_{SE}$ that is needed to maintain the angle of view θ in still picture shooting.

The focal length $f_{SE}$ thus needed is recorded in the data table. Moreover, the lens positions of the individual lens groups GR1 to GR5 corresponding to that focal length $f_{SE}$ are also recorded in the data table. Thus, as described above, the DSC 29 (more specifically, the control section 21) can move the lens groups GR1 to GR4 in such a way as to keep the angle of view of the light acquired constant between during zooming before the switching and during zooming after the switching.

With this design, the type of shooting can be switched (between moving picture shooting and still picture shooting) without the user feeling unnaturalness in the field of view.

In this embodiment, with respect to the lens unit LU, it is preferable that conditional formula (1) below be fulfilled:

$$6.0 < f1/fw\_ty2 < 20.0 \qquad (1)$$

where f1 represents the focal length of the first lens group; and fw_ty2 represents the focal length (in mm) of the variable-magnification optical system OS at the wide-angle end W of zooming in still picture shooting (during magnification variation of the second type).

In this conditional formula (1), the focal length of the first lens group GR1 is normalized by being divided by the focal length of the variable-magnification optical system OS at the wide-angle end W of zooming in still picture shooting. Thus, conditional formula (1) defines, based on the optical power of the first lens group GR1, a range that should preferably be fulfilled to obtain a proper balance between the compactness of the variable-magnification optical system OS (for example, the compactness of the first lens group GR1) and high aberration-correction (reduction) performance.

For example, if the lower limit of conditional formula (1) is disregarded (crossed downward), the first lens group GR1 has a comparatively short focal length, and thus has a comparatively strong positive optical power. This permits the first lens group GR1 to have, for example, a small front element diameter. However, giving the first lens group GR1 a strong optical power tends to produce accordingly large aberrations (in particular, curvature of field and distortion). To correct such aberrations, it becomes necessary to increase the number of lens elements, to use lens elements with aspherical surfaces, or to take other means, and such means make it difficult to make the variable-magnification optical system OS compact.

On the other hand, if the upper limit of conditional formula (1) is disregarded (crossed upward), the first lens group GR1 has a comparatively long focal length, and thus has a comparatively weak positive optical power. Giving the first lens group GR1 a weak optical power helps reduce the aberrations produced thereby. Giving the first lens group GR1 a weak optical power, however, simultaneously makes, for example, the front element diameter of the first lens group GR1 accordingly large.

Thus, when the lower limit of conditional formula (1) is observed, aberrations can be reduced, and, when the upper limit of conditional formula (1) is observed, the lens unit is prevented from having an unduly large side. Thus, within the range defined by conditional formula (1), in this embodiment, it is possible to reduce aberrations (obtain high performance) and simultaneously obtain a compact variable-magnification optical system OS (and hence a compact lens unit).

Within the conditional range defined by conditional formula (1), it is further preferable that the range defined by conditional formula (1a) below be fulfilled:

$$7.0 < f1/fw\_ty2 < 17.0 \quad (1a)$$

In the lens unit LU of this embodiment, it is preferable that conditional formula (2) below be fulfilled:

$$0.05 < f3/f4 < 1.00 \quad (2)$$

where f3 represents the focal length of the third lens group; and
f4 represents the focal length of the fourth lens group.

In this conditional formula (2), the focal length of the third lens group GR3 is normalized by being divided by the focal length of the fourth lens group GR4. Thus, conditional formula (2) defines, based on the optical power ratio between the third and fourth lens groups GR3 and GR4, a range that should preferably be fulfilled to achieve a proper balance between the compactness of the variable-magnification optical system OS and high aberration-correction performance.

For example, if the lower limit of conditional formula (2) is disregarded, the focal length of the third lens group GR3 is too short, or the focal length of the fourth lens group GR4 is too long. That is, the optical power of the third lens group GR3 is comparatively strong, or the optical power of the fourth lens group GR4 is comparatively weak.

Giving the third lens group GR3 a comparatively strong power produces accordingly large aberrations (in particular, spherical aberration). This makes it necessary to satisfactorily correct aberrations by increasing the number of lens elements, using lens elements with aspherical surfaces, and taking other means, and such means make it difficult to make the variable-magnification optical system OS compact.

Giving the fourth lens group GR4 a comparatively weak power helps accordingly reduce the aberrations produced thereby. Giving the fourth lens group GR4 a weak power, however, simultaneously increases the distance that the fourth lens group GR4 needs to travel for focusing. Moreover, Giving the fourth lens group GR4 a weak power also increases the total length of the variable-magnification optical system OS.

On the other hand, if the upper limit of conditional formula (2) is disregarded, in most cases, the focal length of the fourth lens group GR4 is too short. Thus, the optical power of the fourth lens group GR4 is comparatively strong. Giving the fourth lens group GR4 a strong optical power produces accordingly large aberrations (in particular, curvature of field). This makes it difficult to satisfactorily correct curvature of field throughout from the wide-angle end W to the telephoto end T.

Moreover, as the fourth lens group GR4 moves for focusing, focusing causes comparatively large variation in aberrations, in particular curvature of field and chromatic aberrations. To correct such aberrations, it becomes necessary to increase the number of lens elements, to use lens elements with aspherical surfaces, or to take other means, and such means make it difficult to make the variable-magnification optical system OS compact.

Thus, within the range defined by conditional formula (2), the problems described above are overcome. Thus, in this embodiment, it is possible to reduce aberrations (obtain high performance) and simultaneously obtain a compact variable-magnification optical system OS (and hence a compact lens unit LU).

Within the conditional range defined by conditional formula (2), it is further preferable that the range defined by conditional formula (2a) below be fulfilled:

$$0.20 < f3/f4 < 0.80 \quad (2a)$$

The values of conditional formulae (1) and (2) as actually observed in the variable-magnification optical system OS of the first embodiment are as follows:
Conditional formula (1)=9.619
Conditional formula (2)=0.303

For satisfactory correction of chromatic aberrations, in the lens unit LU, it is preferable that the second lens group GR2 include at least one negative lens element and at least one positive lens element (in the first embodiment, the fourth and fifth lens elements L4 and L5 are negative lens elements, and the sixth lens element L6 is a positive lens element).

An attempt to make the variable-magnification optical system OS compact and wide-angle by using the second lens group GR2 tends to give the second lens group GR2 a comparatively strong negative optical power. The increased optical power here results in accordingly large aberrations (in particular negative distortion at the wide-angle end W).

To effectively correct such aberrations, it is preferable that, of the lens elements included in the second lens group GR2, at least one be an aspherical lens element (in the first embodiment, the fourth lens element L4 has an aspherical surface at the surface s6). The shape of the aspherical surface is, for example, such that the negative optical power of the lens element decreases from center to edge thereof. Giving the aspherical surface such a shape permits effective correction of distortion and other aberrations.

For enhanced telecentricity toward the image sensor SR, the lens unit LU includes, on the image side of the lens groups GR1 to GR4 disposed in a "positive-negative-positive-positive" optical power arrangement, the fifth lens group GR5 having a "positive" optical power. Preferably, the fifth lens group GR5 is kept stationary during zooming from the wide-angle end W to the telephoto end T. For example, as described above, the fifth lens group GR5 is kept in a fixed position. With this design, no dead space is produced inside the lens barrel LB as the fifth lens group GR5 moves. This helps prevent the problem of dust or the like settling on the image sensor SR or the IR cut filter PT.

Moreover, it is preferable that the fifth lens group GR5 include only one lens element that exerts an optical effect (in the first embodiment, it includes only one lens element, namely the fourteenth lens element L14). Using only one lens element (positive lens element) there helps reduce the increase in the total length of the variable-magnification optical system OS and the increase in costs resulting from an increased number of lens elements.

Moreover, using only one lens element there helps obtain satisfactory telecentricity toward the image sensor SR in a simple design. Forming this one lens element out of resin (for example, plastic) helps further reduce costs and reduce the weight of the variable-magnification optical system OS (and hence the weight of the lens unit LU).

Second Embodiment

Another embodiment of the present invention will be described below with reference to the relevant drawings. It should be noted that such components as serve the same purposes as in the first embodiment described above are identified with common reference numerals and symbols, and no explanation thereof will be repeated.

Figure 17:
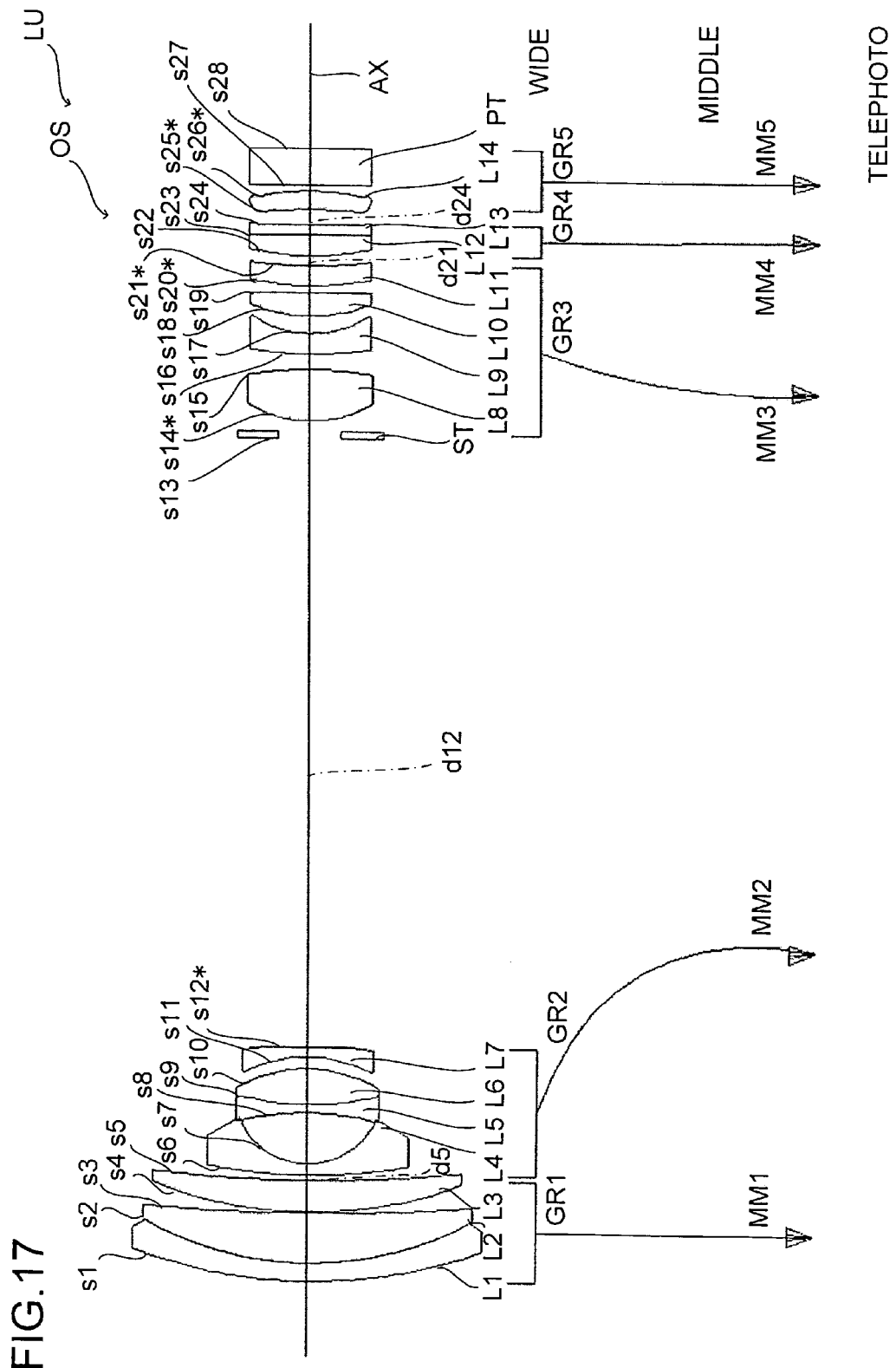
FIG. 17 is a lens construction diagram of a lens unit (the second embodiment) embodying the present invention, in a state in moving picture shooting.
Figure 18:
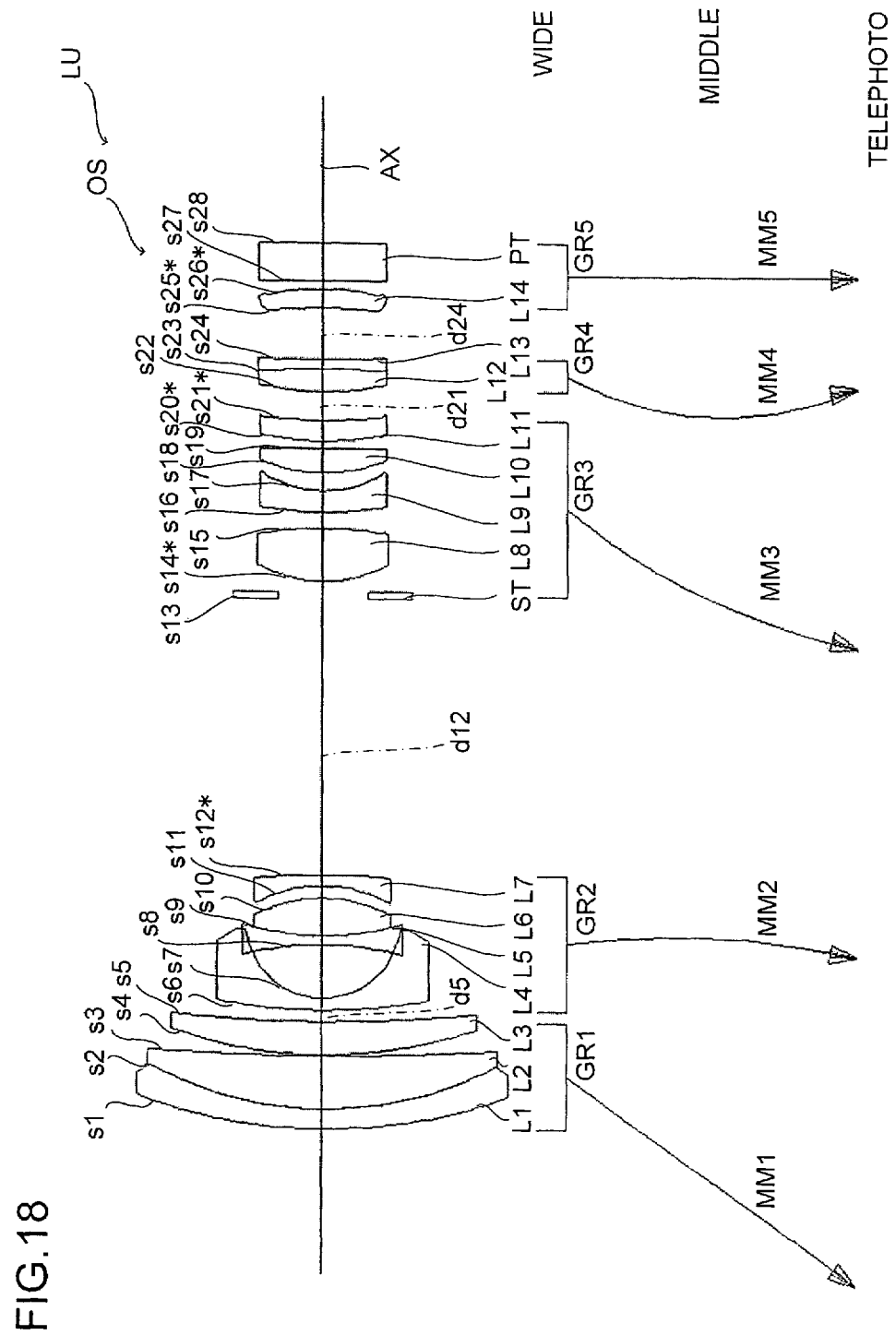
FIG. 18 is a lens construction diagram of the lens unit (the second embodiment) embodying the present invention, in a state in still picture shooting.

A lens unit LU (and hence a DSC 29) according to the present invention is not limited to one provided with the variable-magnification optical system 11 of the first embodiment described above. Now, therefore, another lens unit LU (of the second embodiment) that is so designed as to offer the same effects as described thus far will be described with reference to FIGS. 17 and 18 (for the sake of convenience, in these diagrams, the image sensor SR is omitted). FIG. 17 shows the state of the lens unit LU in moving picture shooting, and FIG. 18 shows the state of the lens unit LU in still picture shooting.

1. Construction of the Lens Unit of the Second Embodiment

As in the first embodiment, the lens unit LU here includes, from the shooting object side, a first lens group GR1, a second lens group GR2, a third lens group GR3, a fourth lens group GR4, a fifth lens group GR5, and an image sensor SR.

1-1. First Lens Group

The first lens group GR1 includes, from the object side, a first lens element L1, a second lens element L2, and a third lens element L3. The first lens group GR1 as a whole has a "positive" optical power (refractive power).

Used as these lens elements are:
The first lens element L1: a negative meniscus lens element convex to the object side;
The second lens element L2: a positive meniscus lens element convex to the object side; and
The third lens element L3: a positive meniscus lens element convex to the object side.

Here, the first and second lens elements L1 and L2 are cemented together at the surface s2 to form a cemented lens element.

1-2. Second Lens Group

The second lens group GR2 includes, from the object side, a fourth lens element L4, a fifth lens element L5, a sixth lens element L6, and a seventh lens element L7. The second lens group GR2 as a whole has a "negative" optical power.

Used as these lens elements are:
The fourth lens element L4: a negative meniscus lens element convex to the object side;
The fifth lens element L5: a biconcave negative lens element;
The sixth lens element L6: a biconvex positive lens element; and
The seventh lens element L7: a negative meniscus lens element concave to the object side (having an aspherical surface at the surface s12).

Here, the fifth and sixth lens elements L5 and L6 are cemented together at the surface s9 to form a cemented lens element.

1-3. Third Lens Group

The third lens group GR3 includes, from the object side, a optical aperture stop ST, an eighth lens element L8, a ninth lens element L9, a tenth lens element L10, and an eleventh lens element L11. The third lens group GR3 as a whole has a "positive" optical power.

Used as these lens elements etc. are:
The optical aperture stop ST: an aperture stop that intercepts part of the light that has passed through the first and second lens groups GR1 and GR2; identified also with the symbol s13; and built integrally with the third lens group GR3;
The eighth lens element L8: a biconvex positive lens element (having an aspherical surface at the surface s14);
The ninth lens element L9: a negative meniscus lens element convex to the object side;
The tenth lens element L10: a positive meniscus lens element convex to the object side; and
The eleventh lens element L11: a negative meniscus lens element convex to the object side (having aspherical surfaces on the surfaces s20 and s21).

1-4. Fourth Lens Group

The fourth lens group GR4 includes, from the object side, a twelfth lens element L12 and a thirteenth lens element L13. The fourth lens group GR4 as a whole has a "positive" optical power.

Used as these lens elements are:
The twelfth lens element L12: a biconvex positive lens element; and
The thirteenth lens element L13: a biconcave negative lens element.

Here, the twelfth and thirteenth lens elements L12 and L13 are cemented together at the surface s23 to form a cemented lens element.

1-5. Fifth Lens Group

The fifth lens group GR5 includes, from the object side, a fourteenth lens element L14 and an IR cut filter PT. The fifth lens group GR5 as whole has a "positive" optical power. As described previously, the fifth lens group GR5 remains stationary during zooming.

Used as these lens elements etc. are:
The fourteenth lens element L14: a negative meniscus lens element concave to the object side (and having aspherical surfaces at the surfaces s25 and s26; and
The IR cut filter PT: a plane-parallel plate having two surfaces s27 and s28; absorbs infrared rays.

2. Construction Data of the Variable-Magnification Optical System (Second Embodiment)

Next, the construction data of the variable-magnification optical system OS provided in the lens unit LU of the second embodiment will be described with reference to Tables 5 and 6. In Tables 5 and 6, the same conventions as used in Tables 1 and 2 are used.

3. Zooming by the DSC

3-1. Behavior of the Variable-Magnification Optical System (Second Embodiment) in Moving Picture Shooting Now, the movement of the individual lens groups GR1 to GR5 will be described in more detail with reference to the movement trails MM1 to MM5 shown in FIG. 17. As shown in FIG. 17, during zooming (from the wide-angle end W to the telephoto end T) in moving picture shooting, as in the first embodiment, the first lens group GR1 remains stationary at the zoom start position (predetermined position) (and the fifth lens group GR5 is fixed at a predetermined position). Thus, the total length of the variable-magnification optical system OS remains constant (fixed) during zooming.

On the other hand, the second to fourth lens groups GR2 to GR4 move to and then rest at respective positions that correspond to a given magnification. For example, during zooming from the wide-angle end W to the telephoto end T, the second lens group GR2 moves toward the image side, the third lens group GR3 moves toward the object side, and the fourth lens group GR4 first moves toward the image side and then makes a U-turn to move back toward the object side. Thus, as in the first embodiment, the group-to-group distances (GR1-GR2, GR2-GR3, GR3-GR4, and GR4-GR5) vary with the magnification.

FIGS. 19A to 19C, 20A to 20C, and 21A to 21C show the aberrations observed in the variable-magnification optical system OS during zooming in moving picture shooting. In FIGS. 19A to 19C, 20A to 20C, and 21A to 21C, the same conventions as used in FIGS. 7A to 7C, 8A to 8C, and 9A to 9C are used.

3-2. Behavior of the Variable-Magnification Optical System (Second Embodiment) in Still Picture Shooting Next, the movement of the individual lens groups GR1 to GR5 will be described in more detail with reference to the movement trails MM1 to MM5 shown in FIG. 18. As shown in FIG. 18, during zooming (from the wide-angle end W to the telephoto end T) in still picture shooting, as in the first embodiment, the first lens group GR1 does not rest at the zoom start position, but moves toward the object side according to the magnification. The fifth lens group GR5, however, is fixed at a predetermined position. Thus, the total length of the variable-magnification optical system OS varies with zooming. Specifically, as in the first embodiment, as zooming is performed from the wide-angle end W toward the telephoto end T, the total length of the variable-magnification optical system OS increases.

Moreover, as during zooming in moving picture shooting, the second to fourth lens groups GR2 to GR4 move to and then rest at respective positions that correspond to a given magnification. For example, during zooming from the wide-angle end W to the telephoto end T, the second lens group GR2 first moves toward the image side and then makes a U-turn to move back toward the object side, the third lens group GR3, like the first lens group GR1, moves toward the object side, and the fourth lens group GR4 first moves toward the object side and then makes a U-turn to move back toward the image side. Thus, as during zooming in moving picture shooting, the group-to-group distances (GR1-GR2, GR2-GR3, GR3-GR4, and GR4-GR5) vary with the magnification.

FIGS. 22A to 22C, 23A to 23C, and 24A to 24C show the aberrations observed in the variable-magnification optical system OS during zooming in moving picture shooting. In FIGS. 22A to 22C, 23A to 23C, and 24A to 24C, the same conventions as used in FIGS. 7A to 7C; 8A to 8C, and 9A to 9C are used.

4. Examples of Various Features of the Second Embodiment

In the lens unit 1 (DSC 29) provided with the variable-magnification optical system 11 of the second embodiment, the second lens group GR2 includes four lens elements. In this respect, the lens unit 1 differs from the lens unit LU described previously in connection with the first embodiment; in other respects, however, the two lens units resemble each other. Thus, needless to say, the optical system unit 1 designed as described above has the same features and offers the same effects as those mentioned in connection with the first embodiment.

Moreover, the values of conditional formulae (1) and (2) as actually observed in the variable-magnification optical system OS of the second embodiment are as follows:

Conditional formula (1)=12.312

Conditional formula (2)=0.241

Both these values lie within the ranges defined by conditional formulae (1) and (2), respectively.

In general, in a variable-magnification optical system OS having a "positive-negative-positive-positive" optical power arrangement, attempting to obtain a high magnification and a wide angle of view results in comparatively large chromatic aberration (in particular lateral chromatic aberration at the wide-angle end W) attributable to the second lens group GR2. One way to correct such aberrations is to include a comparatively low-dispersion negative lens element in the second lens group GR2. The low dispersion of this negative lens element, however, gives it a comparatively low refractive index, and this is undesirable because it is difficult to give the low-refractive-index (weak-optical-power) negative lens element a high refractive index (strong optical power) (for example, by forming a surface with a comparatively small radius of curvature).

Conveniently, however, in the lens unit LU of the second embodiment, where the second lens group GR2 includes at least three negative lens elements (namely, the fourth, fifth, and seventh lens elements L4, L5, and L7) and at least one positive lens element (namely the sixth lens element L6), the negative optical power of the second lens group GR2 can be distributed among a plurality of negative lens elements. This makes it easy to process the negative lens elements. Moreover, the lens unit LU can then correct chromatic aberrations with simple lens elements.

Other Embodiments

The present invention may be carried out in any manner other than specifically described as embodiments above, and many modifications and variations are possible within the spirit of the present invention.

1. Movement of the Individual Lens Groups at Switching Between Different Types of Shooting In a DSC 29 embodying the present invention, as in the examples thereof described previously, when the type of shooting is switched, the angle of view of the light acquired is kept constant between during zooming before the switching and during zooming after the switching so as not to produce unnaturalness in the user's field of view. This, however, is not meant to limit the application of the present invention in any way.

Alternatively, for example, the start positions of the individual lens groups corresponding to each of moving picture shooting mode and still picture shooting mode (moving picture shooting mode start positions and still picture shooting mode start positions) may be prescribed so that, when the type of shooting is switched (between moving picture shooting and still picture shooting), zooming is started at those start positions. With this design, while some unnaturalness is produced in the user's field of view, it is possible to alleviate the burden of control for keeping the angle of view constant between before and after switching of the type of shooting.

Alternatively, a DSC 29 may be so designed that, when the type of shooting is switched, with reference to the state of at least one lens group immediately before the switching, the other lens groups are so moved to obtain the angle of view corresponding to that reference position. With this design, while some unnaturalness is produced in the user's field of view, it is possible to reduce the time required for the lens groups to move to complete switching of the type of shooting (that is, the lens groups move comparatively quickly).

Incidentally, a DSC 29 may be so designed that, when the main power (on/off button 14a) is on, the type of shooting cannot be switched through operation by the user. With this design, the lens groups do not move at switching of the type of shooting, and thus no collision or the like among the lens groups ever occurs.

2. Zoom Start Position

In a DSC 29 embodying the present invention, there is no particular restriction on the rest position (zoom start position) of the first lens group GR1, which remains stationary during zooming in moving picture shooting. It is even then preferable that the zoom start position be located between the rest position (first position) at which the first lens group GR1 rests to capture light at the wide-angle end W of zooming in still picture shooting and the rest position (second position) at which the first lens group GR1 rests to capture light at the telephoto end T of zooming in still picture shooting.

When this zoom start position is expressed in terms of the distance from the image sensor SR, the following relationship (conditional formula (3)) is derived.

$$d(GR1-SR)w\_ty2 < d(GR1-SR)\_ty1 < d(GR1-SR)t\_ty2 \quad (3)$$

where
  $d(GR1-SR)w\_ty2$ represents the distance (in mm) between the first lens group GR1 and the image sensor SR at the wide-angle end W of zooming in still picture shooting (zooming of the second type);
  $d(GR1-SR)\_ty1$ represents the distance (in mm) between the first lens group GR1 and the image sensor SR during zooming of the moving picture shooting (zooming of the first type); and
  $d(GR1-SR)t\_ty2$ represents the distance (in mm) between the first lens group GR1 and the image sensor SR at the telephoto end of zooming in still picture shooting.

With this design, a DSC 29 does not require a special mechanism or the like for setting the zoom start position. That is, during zooming in still picture shooting, the zoom start position is located within the maximum range (limited range) in which the first lens group GR1 is movable. Thus, there is no need to provide a special mechanism or the like to move the first lens group GR1 out of the limited range. This helps reduce the increase in the costs of the DSC 29.

Alternatively, as in the lens unit LU provided with the variable-magnification optical system OS of the second embodiment, conditional formula (4) below may be fulfilled (see "d5" in Table 5).

$$d(GR1-GR2)w\_ty1 < d(GR1-GR2)w\_ty2 \quad (4)$$

where
  $d(GR1-GR2)w\_ty1$ represents the distance (in mm) between the first lens group GR1 and the second lens group GR2 at the wide-angle end W of zooming in moving picture shooting (zooming of the first type); and
  $d(GR1-GR2)w\_ty2$ represents the distance (in mm) between the first lens group GR1 and the second lens group GR2 at the wide-angle end W of zooming in still picture shooting (zooming of the second type).

Usually, as the distance between the first and second lens groups GR1 and GR2 is adjusted, the angle of view of light acquired varies. When the interval between the first and second lens groups GR1 and GR2 is small, it is easy to capture light at a comparatively large angle of view. Thus, a lens unit LU embodying the present invention can capture light at a large angle of view more easily during zooming in moving picture shooting than during zooming in still picture shooting. Thus, a variable-magnification optical system OS that can cope with zooming in moving picture shooting can be designed with increased flexibility.

3. Movement Mechanism of the Lens Groups

In a DSC 29 embodying the present invention, as in the examples thereof described previously, the lens groups GR1 to GR4 that move during zooming are moved independently of one another with the driving forces of the stepping motors G1M to G4M corresponding respectively thereto. This DSC 29 offers the advantage of requiring a movement mechanism (lens barrel LB) having a simple design. A DSC 29 embodying the present invention may have any lens barrel other than such a lens barrel LB.

For example, a lens barrel (movement mechanism) may be used that includes a fixed barrel, a straight-moving barrel, a movable barrel, and a cam ring. With this design, the fixed barrel is fixed to the body of the DSC, and the straight-moving barrel is housed inside the fixed barrel. The movable barrel is housed inside the straight-moving barrel. The cam ring is housed between the fixed barrel and the straight-moving barrel.

The movable barrel has a pin, and this pin is put through a through hole formed in the straight-moving barrel to extend in the direction of the barrel axis thereof (in the axial direction) and then engages (cam-engages) with a first and a second cam groove formed on the inner circumference of the cam ring. Thus, as the cam ring rotates, the movable barrel moves back and forth along the direction of the optical axis. Thus, when the first lens group is fitted via the first lens group holder to the movable barrel, as the cam ring rotates, the first lens group can move (movable) back and forth along the direction of the optical axis. This cam ring (first driving force transmitter) may be rotated by a dedicated stepping motor or DC motor (driving source), or may be rotated manually.

In this way, in a DSC embodying the present invention, even with a lens barrel employing a cam ring, the first lens group (stationary lens group), which remains stationary during zooming in moving picture shooting, can perform zooming in still picture shooting by receiving the driving force (for example, torque) of a stepping motor via the cam ring (first driving force transmitter). On the other hand, the second to fourth lens groups (movable lens groups), which move during zooming in moving picture shooting, can move during zooming in both moving picture shooting and still picture shooting by receiving the driving forces of the stepping motors via racks (second driving force transmitter) or the like.

Thus, in the DSC, only the first lens group, which remains stationary during zooming in moving picture shooting, can move for zooming in still picture shooting by receiving the driving force of a stepping motor or the like via the cam ring. On the other hand, the lens groups that move during zooming in moving picture shooting (that is, the second to fourth lens groups) can move for zooming in both moving picture shooting and still picture shooting by receiving the driving forces of the stepping motors or the like via racks.

With this design, when the first lens group GR1, the heaviest, is moved, it can be moved with speed reduction achieved via the cam ring. This helps reduce the burden on the stepping motor or the like, and makes it possible to use a comparatively low-output, inexpensive stepping motor. This makes it possible to realize the DSC 29 at lower costs.

4. The Present Invention as Considered from the Perspective of the Software and Storage Medium it Uses In a DSC 29 embodying the present invention, the operation of the individual functional blocks thereof (such as the control section 21) is achieved also through execution of software programs (for example, a program for controlling magnification variation) that make them function. These programs are for making a computer perform predetermined operations, and can be recorded on a recording medium that the computer can read. This makes it possible to freely carry around the programs in the form recorded on the recording medium.

Used as the recording medium is, for example, a program medium in the form of a memory such as a ROM that permits processing by a microcomputer, or a program medium in the form of a program reading device in which a recording medium is loaded for reading.

In any case, the stored programs may be executed when accessed by the microprocessor (for example, the control section 21). Alternatively, in any case, programs may be read and downloaded into an unillustrated program storage area and then executed. The program for the downloading here is assumed to be previously stored in the apparatus main body (DSC 29).

The above-mentioned program medium is, for example, a recording medium built separably from the main body (DSC 29), specifically: one in the form of a tape such as a magnetic tape or cassette tape; one in the form of a magnetic disk such as a floppy disk or hard disk; one in the form of an optical disk such as a CD-ROM, MO, MD, or DVD; one in the form of a card such as an IC card or optical card; or one that stores programs on a fixed basis, including a semiconductor memory such as a mask ROM, EPROM (erasable programmable read-only memory), EEPROM (electronically erasable and programmable read-only memory), or flash memory.

A DSC 29 embodying the present invention may be so configured as to be connectable to a communication network such as the Internet. In this case, programs may be downloaded over the communication network and stored in a recording medium that stores them on an as-necessary basis.

In a case where programs are downloaded over a communication network as described above, the program for the downloading may be previously stored in the apparatus main body (DSC 29), or ay be installed from another recording medium.

5. Modifications and Variations Possible in the Present Invention

The present invention can be grasped from different perspectives, of which some will be presented below.

For example, in an image-taking apparatus embodying the present invention, it is preferable that the image-sensing area on the image sensor that is used in moving picture shooting be smaller than the image-sensing area on the image sensor that is used in still picture shooting. This is because, in an image-taking apparatus capable of both moving picture shooting and still picture shooting, usually, while high performance (for example, high image quality and high resolution) is sought in still picture shooting, not so much in moving picture shooting.

In an image-taking apparatus embodying the present invention, a switcher is provided for switching between moving picture shooting and still picture shooting. When the switcher performs switching, the lens groups move in such a way that the angle of view of the light captured is kept constant between during magnification variation before the switching and during magnification variation after the switching.

Specifically, a magnification variation control method embodying the present invention includes: a switching step of stitching between moving picture shooting and still picture shooting; and an angle-of-view maintaining step of moving, when switching is performed in the switching step, lens groups in such a way that the angle of view of the light captured is kept constant between during magnification variation before the switching and during magnification variation after the switching With this design, the type of shooting can be switched (between moving picture shooting and still picture shooting) without the user feeling unnaturalness in the field of view.

In an image-taking apparatus embodying the present invention, it is preferable that the stationary lens group that is kept stationary during magnification variation in moving picture shooting be located between a first position where the stationary lens group captures light at a first angle of view during magnification variation in still picture shooting and a second position where the stationary lens group captures light at a second angle of view during magnification variation in still picture shooting.

With this design, there is no need to provide a special mechanism or the like for setting the position at which to start magnification variation (the zoom start position) in moving picture shooting. This helps reduce the increase in the costs of the image-taking apparatus embodying the present invention.

There is no particular restriction on the movement mechanism used in the present invention. For example, the movement mechanism may include a plurality of driving sources so that the lens groups that move during magnification variation are moved independently of one another with the driving forces of the driving sources corresponding respectively thereto.

The movement mechanism may include a driving source and a first driving force transmitter that changes (for example, the torque) and transmits (for example, while reducing) the driving force of the driving source. In this case, in an image-taking apparatus embodying the present invention, only the lens group that remains stationary during magnification variation in moving picture shooting receives the driving force of the driving source via the first driving force transmitter (for example, a cam ring) to move during magnification variation in still picture shooting.

On the other hand, to permit the other lens groups to move, the movement mechanism further includes a second driving force transmitter that transmits the driving force of the driving source directly (unchanged). Thus, in an image-taking apparatus embodying the present invention, while only the lens group that remains stationary during magnification variation in moving picture shooting receives the driving force of the driving source via the first driving force transmitter to move during magnification variation in still picture shooting, the lens groups that move during magnification variation in moving picture shooting receive the driving force of the driving source via the second driving source transmitter (for example, racks) to move during magnification variation in both moving picture shooting and still picture shooting.

In an image-taking apparatus embodying the present invention, the movement of individual functional blocks (such as lens groups) is achieved also through execution of software programs (for example, a program for controlling magnification variation) that make them function.

For example, an image-taking apparatus embodying the present invention is provided with: a variable-magnification optical system having a plurality of lens groups including at least one lens group movable by being driven by a movement mechanism that uses the driving force of a driving source; an image sensor that receives light from a shooting object as captured by the variable-magnification optical system; and a control section that controls the operation of the driving source. Here, the image sensor is switchable between moving picture shooting and still picture shooting.

Thus, the present invention can be practiced as a magnification variation control program that makes a control section control the operation of a driving source in such a way that at least one of movable lens groups travels different movement trails between during magnification variation in moving picture shooting and during magnification variation in still picture shooting.

In an image-taking apparatus embodying the present invention, of a plurality of lens groups, at least two may be made movable so that magnification variation is performed in such a way as to capture light between at a first angle of view and at a second angle of view. To achieve this, a magnification variation control program embodying the present invention makes a control section control the operation of a driving source in such a way that, while the total length of a variable-magnification optical system is kept constant during magnification variation from the first angle of view to the second angle of view in moving picture shooting, the total length of the variable-magnification optical system is varied during magnification variation from the first angle of view to the second angle of view in still picture shooting.

Alternatively, in an image-taking apparatus embodying the present invention, of a plurality of lens groups, at least three may be made movable so that magnification variation is performed in such a way as to capture light between at a first angle of view and at a second angle of view. To achieve this, a magnification variation control program embodying the present invention makes a control section control the operation of a driving source in such a way that the number of lens groups that move during magnification variation from the first angle of view to the second angle of view in moving picture shooting is smaller than the number of lens groups that move during magnification variation from the first angle of view to the second angle of view in still picture shooting.

A magnification variation control program embodying the present invention may make a control section control the operation of a driving source in such a way that, of a plurality of lens groups, the most object-side one is kept stationary during magnification variation in moving picture shooting, while the same lens group is moved during magnification variation in still picture shooting.

Alternatively, a magnification variation control program embodying the present invention may make a control section control the operation of a driving source in such a way that, of a plurality of lens groups, the heaviest one is kept stationary during magnification variation in moving picture shooting, while the same lens group is moved during magnification variation in still picture shooting.

In an image-taking apparatus embodying the present invention, a control section controls the operation of an image sensor to perform moving picture shooting or still picture shooting. Thus, a magnification variation control program embodying the present invention may make the control section perform control such that the image-sensing area on the image sensor that is used in moving picture shooting is smaller than the image-sensing area on the image sensor that is used in still picture shooting.

In an image-taking apparatus embodying the present invention, a switcher is provided for switching between moving picture shooting and still picture shooting. Thus, a magnification variation control program embodying the present invention may make a control section control the operation of a driving source for moving lens groups in such a way that, when the switcher performs switching, the angle of view of the light captured remains constant between during magnification variation before the switching and during magnification variation after the switching.

The present invention can be practiced as a computer-readable recording medium having such a magnification variation control program recorded thereto.

The present invention can be grasped also as a lens unit. In this case, a lens unit embodying the present invention includes: a variable-magnification optical system having a plurality of lens groups; and an image sensor that receives light that has passed through the variable-magnification optical system. Here, at least one of the plurality of lens groups travels different movement trails between during magnification variation of a first type and during magnification variation of a second type.

In a lens unit embodying the present invention, the plurality of lens groups include at least a first lens group having a positive optical power, a second lens group having a negative optical power, a third lens group having a positive optical power, and a fourth lens group having a positive optical power.

For example, suppose that a lens unit embodying the present invention is incorporated in an image-taking apparatus, and this image-taking apparatus is capable of both moving picture shooting and still picture shooting. Then, with the lens unit embodying the present invention, it is possible to achieve magnification variation based on one of various patterns of movement of the individual lens groups that suits the type of shooting (moving picture shooting (shooting of a first type) or still picture shooting (shooting of a second type)).

In a lens unit embodying the present invention, it is particularly preferable that the first lens group travel different movement trails between during magnification variation of a first type and during magnification variation of a second type. For example, preferably, while the first lens group remains stationary during magnification variation of the first type, it moves during magnification variation of the second type, thus traveling a different movement trail.

In an image-taking apparatus incorporating a lens unit embodying the present invention, as a result of the first lens group being kept stationary during magnification variation of a first type as described above, no noise (zooming noise) is produced as would be produced if the first lens group were moved for magnification variation. Considering in particular that the movement distance of the first lens group conventionally tends to be longer than those of the other lens groups, by preventing such noise, it is possible to effectively overcome the problem of zooming noise.

In a lens unit embodying the present invention, during magnification variation of a second type, the first lens group can be moved in a way that suits the magnification variation factor. For example, when the first lens group is moved so as to capture light at the wide-angle end of magnification variation of the second type, in a lens unit embodying the present invention, the first lens group can be prevented from being moved out toward the object side so much as during magnification variation of the first type (that is, from being moved as far as a predetermined position). In this case, the first lens group has only to be designed to capture light at a comparatively small angle of view. This helps make the first lens group (hence the lens unit) comparatively compact.

In a lens unit embodying the present invention, the first lens group is movable during magnification variation of the second type. Thus, even when the first lens group is of the same size as the one provided in a lens unit (conventional image-taking apparatus) in which the first lens group is kept stationary during magnification variation of the second type, the lens unit embodying the present invention permits shooting at a higher magnification than the conventional image-taking apparatus.

Thus, according to the present invention, it is possible to realize a lens unit that, while offering high performance, includes a compact variable-magnification optical system. In addition, with a lens unit embodying the present invention, since the first lens group is kept stationary, it is possible to overcome the problem of zooming noise.

In a lens unit embodying the present invention, it is preferable that conditional formula (1) below be fulfilled.

$$6.0 < f1/fw\_ty2 < 20.0 \quad (1)$$

where
 f1 represents the focal length of the first lens group; and
 fw_ty2 represents the focal length of the variable-magnification optical system at the wide-angle end W of magnification variation of the second type.

Conditional formula (1) defines, based on the optical power of the first lens group, a range that should preferably be fulfilled to obtain a proper balance between the compactness of the variable-magnification optical system and high aberration-correction performance. Thus, within the range defined by conditional formula (1), according to the present invention, it is possible to realize a lens unit that, despite operating with reduced (corrected) aberrations, is compact.

In a lens unit embodying the present invention, it is preferable that conditional formula (2) below be fulfilled.

$$0.05 < f3/f4 < 1.00 \quad (2)$$

where
 f3 represents the focal length of the third lens group; and
 f4 represents the focal length of the fourth lens group.

Conditional formula (2) defines, based on the optical power ratio between the third and fourth lens groups GR3 and GR4, a range that should preferably be fulfilled to achieve a proper balance between the compactness of the variable-magnification optical system and high aberration-correction performance. Thus, within the range defined by conditional formula (2), according to the present invention, it is possible to realize a lens unit that, despite operating with reduced aberrations, is compact.

In a lens unit embodying the present invention, for satisfactory correction of chromatic and other aberrations, it is preferable that the second lens group include at least one negative lens element and at least one positive lens element. Moreover, for satisfactory correction of distortion and other aberrations, the negative lens element included in the second lens group may have an aspherical surface formed therein.

In a lens unit embodying the present invention, it is preferable that conditional formula (3) below be fulfilled.

$$d(GR1-SR)w\_ty2 < d(GR1-SR)\_ty1 < d(GR1-SR)t\_ty2 \quad (3)$$

where
 d(GR1–SR)w_ty2 represents the distance between the first lens group and the image sensor at the wide-angle end of magnification variation of the second type;
 d(GR1–SR)_ty1 represents the distance between the first lens group and the image sensor during magnification variation of the first type; and
 d(GR1–SR)t_ty2 represents the distance between the first lens group and the image sensor at the telephoto end of magnification variation of the second type.

With this design, during magnification variation of the second type, the zoom start position of the first lens group during magnification variation of the first type is located within the maximum range (limited range) in which the first lens group GR1 is movable. Thus, there is no need to provide a special mechanism or the like to move the first lens group out of the limited range.

In a lens unit embodying the present invention, it is preferable that conditional formula (4) below be fulfilled.

$$d(GR1-GR2)w\_ty1 < d(GR1-GR2)w\_ty2 \quad (4)$$

where
 d(GR1–GR2)w_ty1 represents the distance between the first lens group and the second lens group at the wide-angle end of magnification variation of the first type; and
 d(GR1–GR2)w_ty2 represents the distance between the first lens group and the second lens group at the wide-angle end of magnification variation of the second type.

For example, when the interval between the first and second lens groups is small, it is often easy to capture light at a comparatively large angle of view. Thus, a lens unit embodying the present invention can capture light at a large angle of view more easily during magnification variation of the first type than during magnification variation of the second type. Thus, a variable-magnification optical system that can cope with magnification variation of the first type can be designed with increased flexibility.

By incorporating a lens unit as described above, an image-taking apparatus embodying the present invention is compact, offers high performance, and boasts of quiet operation.

In an image-taking apparatus, different levels of performance are often required between for magnification variation of a first type and for magnification variation of a second type. Accordingly, in a lens unit embodying the present invention that is incorporated in such an image-taking apparatus capable of two types of shooting, the image-sensing area on an image sensor that is used during magnification variation of the first type may be smaller than the image-sensing area on the image sensor that is used during magnification variation of the second type.

In an image-taking apparatus as described above, a switcher is provided that switches between magnification variation of the first type and magnification variation of the second type, with magnification variation of the first type performed in moving picture shooting and magnification variation of the second type performed in still picture shooting.

The embodiments, examples, and the like specifically described above are merely intended to make the technical idea of the present invention clear. The present invention, therefore, should not be interpreted narrowly within the extent of what is specifically described above, but should be interpreted to allow many modifications and variations within the scope of the appended claims.

TABLE 1

Embodiment 1

| Focal Length Position | | | | (W)~(M)~(T) | | | |
|---|---|---|---|---|---|---|---|
| f[mm] | | | MV | 3.29~13.73~57.40 | | | |
| | | | SE | 6.01~25.16~104.97 | | | |
| FNO | | | MV | 2.88~4.50~4.60 | | | |
| | | | SE | 2.88~4.50~4.60 | | | |

| i | ri[mm] | | i | di[mm] | i | Ni | νi | Element |
|---|---|---|---|---|---|---|---|---|
| 1 | 49.495 | | | | | | | GR1 |
| | | | 1 | 2.010 | 1 | 1.84666 | 23.78 | L1 |
| 2 | 34.901 | | | | | | | |
| | | | 2 | 5.203 | 2 | 1.49700 | 81.61 | L2 |
| 3 | −691.228 | | | | | | | |
| | | | 3 | 0.100 | | | | |
| 4 | 33.472 | | | | | | | |
| | | | 4 | 3.169 | 3 | 1.60300 | 65.44 | L3 |
| 5 | 69.607 | | | MV 1.000~22.158~33.948 | | | | |
| | | | 5 | | | | | |
| 6 | 53.264 | * | | SE 1.000~21.172~34.557 | | | | GR2 |
| | | | 6 | 1.100 | 4 | 1.77250 | 49.77 | L4 |
| 7 | 7.836 | | | | | | | |
| | | | 7 | 6.376 | | | | |
| 8 | −10.227 | | | | | | | |
| | | | 8 | 1.010 | 5 | 1.48749 | 70.44 | L5 |
| 9 | 16.597 | | | | | | | |
| | | | 9 | 2.192 | 6 | 1.84666 | 23.78 | L6 |
| 10 | 586.276 | | | MV 51.470~23.949~5.517 | | | | GR3 |
| | | | 10 | | | | | |
| 11 | ∞ | | | SE 26.823~8.838~1.516 | | | | |
| | | | | | | | | ST |
| | | | 11 | 1.800 | | | | |
| 12 | 9.949 | | | | | | | |
| | | | 12 | 3.154 | 7 | 1.48749 | 70.44 | L7 |
| 13 | 244.380 | | | | | | | |
| | | | 13 | 8.898 | | | | |
| 14 | 18.859 | * | | | | | | |
| | | | 14 | 1.972 | 8 | 1.77250 | 49.77 | L8 |
| 15 | 18.032 | | | | | | | |
| | | | 15 | 1.551 | | | | |
| 16 | 38.097 | | | | | | | |
| | | | 16 | 0.910 | 9 | 1.80610 | 33.27 | L9 |
| 17 | 10.000 | | | | | | | |
| | | | 17 | 3.800 | 10 | 1.49700 | 81.61 | L10 |
| 18 | −12.822 | | | | | | | |
| | | | 18 | 3.653 | | | | |
| 19 | −10.755 | * | | | | | | |
| | | | 19 | 1.200 | 11 | 1.53048 | 55.72 | L11 |
| 20 | −21.337 | * | | MV 1.000~7.373~2.975 | | | | |
| | | | 20 | | | | | |
| 21 | 29.771 | | | SE 3.167~4.928~29.279 | | | | |
| | | | 21 | 2.075 | 12 | 1.58144 | 40.89 | L12 | GR4 |
| 22 | −50.210 | | | | | | | |
| | | | 22 | 0.980 | 13 | 1.84666 | 23.78 | L13 |
| 23 | −303.304 | | | MV 1.567~1.558~12.597 | | | | |
| | | | 23 | | | | | |
| 24 | −25.643 | * | | SE 3.590~13.202~4.227 | | | | GR5 |
| | | | 24 | 1.768 | 14 | 1.53048 | 55.72 | L14 |
| 25 | −15.450 | * | | | | | | |
| | | | 25 | 1.000 | | | | |
| 26 | ∞ | | | | | | | |
| | | | 26 | 3.500 | 15 | 1.51633 | 64.14 | PT |
| 27 | ∞ | | | | | | | |

TABLE 2

Embodiment 1

Aspherical Surface Data of Surface 6(i = 6)

| ε | 1.0000 |
|---|---|
| A4 | 0.47682540E−04 |
| A6 | 0.47422721E−07 |
| A8 | −0.14909735E−07 |
| A10 | 0.26284016E−09 |
| A12 | −0.16274244E−011 |

TABLE 2-continued

Embodiment 1

Aspherical Surface Data
of Surface 14(i = 14)

| | |
|---|---|
| ε | 1.0000 |
| A4 | −0.14609364E−03 |
| A6 | −0.65176040E−06 |
| A8 | −0.26701526E−07 |
| A10 | 0.68837483E−09 |
| A12 | −0.67312545E−011 |

Aspherical Surface Data
of Surface 19(i = 19)

| | |
|---|---|
| ε | 1.0000 |
| A4 | −0.84819509E−04 |
| A6 | 0.70461219E−05 |
| A8 | −0.28021729E−06 |

Aspherical Surface Data
of Surface 20(i = 20)

| | |
|---|---|
| ε | 1.0000 |
| A4 | −0.10834851E−03 |

TABLE 2-continued

Embodiment 1

| | |
|---|---|
| A6 | 0.79727593E−05 |
| A8 | −0.41135391E−06 |
| A10 | 0.59542428E−08 |
| A12 | −0.15958390E−010 |

Aspherical Surface Data
of Surface 24(i = 24)

| | |
|---|---|
| ε | 1.0000 |
| A4 | 0.57113952E−03 |
| A6 | −0.16328764E−05 |
| A8 | −0.21069336E−05 |
| A10 | 0.73337090E−07 |

Aspherical Surface Data
of Surface 25(i = 25)

| | |
|---|---|
| ε | 1.0000 |
| A4 | 0.90842475E−03 |
| A6 | 0.16579325E−04 |
| A8 | −0.43688361E−05 |
| A10 | 0.13256343E−06 |

TABLE 3

| FOG. | Focal Length Position | GR1~GR2 [mm] | GR2~GR3 [mm] | GR3~GR4 [mm] | GR4~GR5 [mm] | GR5~PT [mm] | TOTAL LENGTH [mm] |
|---|---|---|---|---|---|---|---|
| 13A | Wide(W) | 1.00 | 51.47 | 1.00 | 1.57 | 1.00 | 56.04 |
| 13B | | 24.03 | 22.32 | 5.00 | 3.69 | 1.00 | 56.04 |
| 13C | | 22.16 | 23.95 | 7.37 | 1.56 | 1.00 | 56.04 |
| 13D | ↕ | 20.00 | 10.29 | 23.19 | 1.55 | 1.00 | 56.04 |
| 13E | | 30.00 | 11.85 | 4.87 | 8.32 | 1.00 | 56.04 |
| 13F | | 29.97 | 7.04 | 5.00 | 13.03 | 1.00 | 56.04 |
| 13G | Telephoto(T) | 33.95 | 5.52 | 2.98 | 12.60 | 1.00 | 56.04 |

TABLE 4

| FIG. | Focal Length Position | GR1~GR2 [mm] | GR2~GR3 [mm] | GR3~GR4 [mm] | GR4~GR5 [mm] | GR5~PT [mm] | TOTAL LENGTH [mm] |
|---|---|---|---|---|---|---|---|
| 14A | Wide(W) | 1.00 | 26.82 | 3.17 | 3.59 | 1.00 | 35.58 |
| 14B | | 13.49 | 13.84 | 10.54 | 5.59 | 1.00 | 44.45 |
| 14C | | 21.17 | 8.84 | 4.93 | 13.20 | 1.00 | 49.14 |
| 14D | ↕ | 27.33 | 5.80 | 4.45 | 16.05 | 1.00 | 54.63 |
| 14E | | 31.41 | 3.27 | 6.40 | 16.92 | 1.00 | 59.00 |
| 14F | | 33.99 | 1.71 | 15.99 | 12.36 | 1.00 | 65.05 |
| 14G | Telephoto(T) | 34.56 | 1.52 | 29.28 | 4.23 | 1.00 | 70.58 |

TABLE 5

Embodiment 2

| Focal Length Position | | | (W)~(M)~(T) |
|---|---|---|---|
| f[mm] | | MV | 2.19~21.34~38.29 |
| | | SE | 4.79~20.01~83.61 |
| FNO | | MV | 2.88~3.95~4.60 |
| | | SE | 2.88~4.50~4.60 |

| i | ri[mm] | i | di[mm] | i | Ni | νi | Element |
|---|---|---|---|---|---|---|---|
| 1 | 48.046 | | | | | | GR1 |
| | | 1 | 1.810 | 1 | 1.84666 | 23.78 | L1 |
| 2 | 32.520 | | | | | | |
| | | 2 | 4.793 | 2 | 1.49700 | 81.61 | L2 |
| 3 | 216.830 | | | | | | |
| | | 3 | 0.100 | | | | |

TABLE 5-continued

Embodiment 2

| | | | | | | | | | | |
|---|---|---|---|---|---|---|---|---|---|---|
| 4 | 40.814 | | | | | | | | | |
| | | | 4 | | | 3.024 | 3 | 1.72916 | 54.67 | L3 |
| 5 | 134.145 | | | MV | 0.500~32.661~36.130 | | | | | |
| | | | 5 | | | | | | | |
| 6 | 49.766 | | | SE | 1.000~17.749~37.031 | | | | | GR2 |
| | | | 6 | | | 1.100 | 4 | 1.88300 | 40.79 | L4 |
| 7 | 7.051 | | | | | | | | | |
| | | | 7 | | | 4.860 | | | | |
| 8 | −28.453 | | | | | | | | | |
| | | | 8 | | | 0.810 | 5 | 1.88300 | 40.79 | L5 |
| 9 | 25.111 | | | | | | | | | |
| | | | 9 | | | 3.404 | 6 | 1.84666 | 23.78 | L6 |
| 10 | −12.886 | | | | | | | | | |
| | | | 10 | | | 1.126 | | | | |
| 11 | −12.485 | | | | | | | | | |
| | | | 11 | | | 1.000 | 7 | 1.77250 | 49.36 | L7 |
| 12 | −127.118 | * | | MV | 59.073~18.387~11.078 | | | | | |
| | | | 12 | | | | | | | |
| 13 | ∞ | | | SE | 25.738~7.763~2.300 | | | | ST | GR3 |
| | | | 13 | | | 1.300 | | | | |
| 14 | 10.536 | * | | | | | | | | |
| | | | 14 | | | 4.947 | 8 | 1.58913 | 61.25 | L8 |
| 15 | −31.126 | | | | | | | | | |
| | | | 15 | | | 1.471 | | | | |
| 16 | 34.760 | | | | | | | | | |
| | | | 16 | | | 1.972 | 9 | 1.84666 | 23.78 | L9 |
| 17 | 9.904 | | | | | | | | | |
| | | | 17 | | | 1.664 | | | | |
| 18 | 14.868 | | | | | | | | | |
| | | | 18 | | | 2.186 | 10 | 1.49700 | 81.61 | L10 |
| 19 | 361.191 | | | | | | | | | |
| | | | 19 | | | 0.688 | | | | |
| 20 | 21.480 | * | | | | | | | | |
| | | | 20 | | | 1.874 | 11 | 1.53048 | 55.72 | L11 |
| 21 | 34.220 | * | | MV | 1.000~9.946~11.158 | | | | | |
| | | | 21 | | | | | | | |
| 22 | 24.152 | | | SE | 2.628~12.207~26.261 | | | | | |
| | | | 22 | | | 2.027 | 12 | 1.49700 | 81.61 | L12 | GR4 |
| 23 | −249.619 | | | | | | | | | |
| | | | 23 | | | 0.911 | 13 | 1.80420 | 46.50 | L13 |
| 24 | 151.778 | | | MV | 1.481~1.060~3.688 | | | | | |
| 25 | −48.164 | * | | SE | 4.688~11.766~6.462 | | | | | GR5 |
| | | | 25 | | | 1.743 | 14 | 1.53048 | 55.72 | L14 |
| 26 | −18.223 | * | | | | | | | | |
| | | | 26 | | | 0.635 | | | | |
| 27 | ∞ | | | | | | | | | |
| | | | 26 | | | 3.500 | 15 | 1.51633 | 64.14 | PT |
| 28 | ∞ | | | | | | | | | |

TABLE 6

Embodiment 2

Aspherical Surface Data of Surface 12(i = 12)

| | |
|---|---|
| ϵ | 1.0000 |
| A4 | −0.91663343E−04 |
| A6 | −0.66526238E−06 |
| A8 | 0.34212125E−07 |
| A10 | −0.15524820E−08 |

Aspherical Surface Data of Surface 14(i = 14)

| | |
|---|---|
| ϵ | 1.0000 |
| A4 | −0.12010345E−03 |
| A6 | −0.16553806E−05 |
| A8 | 0.93010493E−07 |
| A10 | −0.34273164E−08 |
| A12 | 0.42099538E−010 |

TABLE 6-continued

Embodiment 2

Aspherical Surface Data of Surface 20(i = 20)

| | |
|---|---|
| ϵ | 1.0000 |
| A4 | −0.16318948E−03 |
| A6 | 0.69910303E−05 |
| A8 | −0.74691802E−06 |
| A10 | 0.19648128E−07 |
| A12 | −0.10541709E−09 |

Aspherical Surface Data of Surface 21(i = 21)

| | |
|---|---|
| ϵ | 1.0000 |
| A4 | −0.82361509E−04 |
| A6 | 0.65356103E−05 |
| A8 | −0.69009511E−06 |
| A10 | 0.16103161E−07 |
| A12 | 0.13433638E−015 |

TABLE 6-continued

Embodiment 2

Aspherical Surface Data
of Surface 25(i = 25)

| | |
|---|---|
| ε | 1.0000 |
| A4 | 0.27609576E−03 |
| A6 | 0.31488940E−04 |
| A8 | −0.55238893E−05 |
| A10 | 0.15369530E−06 |

Aspherical Surface Data
of Surface 26(i = 26)

| | |
|---|---|
| ε | 1.0000 |
| A4 | 0.73903613E−03 |
| A6 | 0.32391718E−04 |
| A8 | −0.69254038E−05 |
| A10 | 0.19316650E−06 |

What is claimed is:

1. An image-taking apparatus comprising:
a variable-magnification optical system that includes a plurality of lens groups of which at least two of the lens groups are movable along an optical axis by being driven by a movement mechanism; and
an image sensor that receives light from a shooting object as captured by the variable-magnification optical system,
wherein the image sensor is switchable between moving picture shooting and still picture shooting,
wherein at least one of movable lens groups travels different movement trails during magnification variation between moving picture shooting and still picture shooting,
wherein at least two of the lens groups are movable so as to capture light between a first angle of view and a second angle of view, and
wherein, while a total length of the variable-magnification optical system remains constant during magnification variation between the first angle of view and the second angle of view in moving picture shooting, the total length of the variable-magnification optical system varies during magnification variation between the first angle of view and the second angle of view in still picture shooting.

2. The image-taking apparatus of claim 1,
wherein, of the plurality of lens groups, the most object-side lens group remains stationary during magnification variation in moving picture shooting, and moves during magnification variation in still picture shooting.

3. The image-taking apparatus of claim 2,
wherein the lens group that remains stationary during variation magnification in moving picture shooting is located between a first position in which the stationary lens group captures light at the first angle of view during magnification variation in still picture shooting and a second position in which the stationary lens group captures light at the second angle of view during magnification variation in still picture shooting.

4. The image-taking apparatus of claim 2,
wherein the movement mechanism includes a plurality of driving sources so that any lens group that moves during magnification variation is driven independently by a driving force of a corresponding one of the driving sources.

5. The image-taking apparatus of claim 2,
wherein the movement mechanism includes a driving source and a first driving force transmitter that reduces and transmits a driving force of the driving source to permit a lens group to move along the optical axis, and
wherein only the lens group that remains stationary during variation magnification in moving picture shooting moves during magnification variation in still picture shooting by receiving the driving force of the driving source via the first driving force transmitter.

6. The image-taking apparatus of claim 5,
wherein the movement mechanism further includes a second driving force transmitter that directly transmits the driving force of the driving source to permit a lens group to move along the optical axis, and
wherein the lens group that moves during variation magnification in moving picture shooting moves during magnification variation during both moving picture shooting and still picture shooting by receiving the driving force of the driving source via the second driving force transmitter.

7. The image-taking apparatus of claim 1,
wherein, of the plurality of lens groups, the heaviest lens group remains stationary during magnification variation in moving picture shooting, and moves during magnification variation in still picture shooting.

8. The image-taking apparatus of claim 7,
wherein the lens group that remains stationary during variation magnification in moving picture shooting is located between a first position in which the stationary lens group captures light at the first angle of view during magnification variation in still picture shooting and a second position in which the stationary lens group captures light at the second angle of view during magnification variation in still picture shooting.

9. The image-taking apparatus of claim 7,
wherein the movement mechanism includes a plurality of driving sources so that any lens group that moves during magnification variation is driven independently by a driving force of a corresponding one of the driving sources.

10. The image-taking apparatus of claim 7,
wherein the movement mechanism includes a driving source and a first driving force transmitter that reduces and transmits a driving force of the driving source to permit a lens group to move along the optical axis, and
wherein only the lens group that remains stationary during variation magnification in moving picture shooting moves during magnification variation in still picture shooting by receiving the driving force of the driving source via the first driving force transmitter.

11. The image-taking apparatus of claim 10,
wherein the movement mechanism further includes a second driving force transmitter that directly transmits the driving force of the driving source to permit a lens group to move along the optical axis, and
wherein the lens group that moves during variation magnification in moving picture shooting moves during magnification variation during both moving picture shooting and still picture shooting by receiving the driving force of the driving source via the second driving force transmitter.

12. The image-taking apparatus of claim 1,
wherein an image-sensing area of the image sensor used in moving picture shooting is smaller than an image-sensing area of the image sensor used in still picture shooting.

13. The image-taking apparatus of claim 12, further comprising:
a switcher that performs switching between moving picture shooting and still picture shooting,
wherein, when the switcher performs switching, the lens groups move so that an angle of view of light remains constant between a magnification before switching and a magnification after switching.

14. An image-taking apparatus comprising:
a variable-magnification optical system that includes a plurality of lens groups of which at least three of the lens groups are movable along an optical axis by being driven by a movement mechanism; and
an image sensor that receives light from a shooting object as captured by the variable-magnification optical system,
wherein the image sensor is switchable between moving picture shooting and still picture shooting,
wherein at least one of movable lens groups travels different movement trails during magnification variation between moving picture shooting and still picture shooting,
wherein at least three of the lens groups are movable so as to capture light between a first angle of view and a second angle of view, and
wherein a number of lens groups that move during magnification variation between the first angle of view and the second angle of view in moving picture shooting is smaller than a number of lens groups that move during magnification variation between the first angle of view and the second angle of view in still picture shooting.

15. The image-taking apparatus of claim 14,
wherein, of the plurality of lens groups, the most object-side lens group remains stationary during magnification variation in moving picture shooting, and moves during magnification variation in still picture shooting.

16. The image-taking apparatus of claim 15,
wherein the lens group that remains stationary during variation magnification in moving picture shooting is located between a first position in which the stationary lens group captures light at the first angle of view during magnification variation in still picture shooting and a second position in which the stationary lens group captures light at the second angle of view during magnification variation in still picture shooting.

17. The image-taking apparatus of claim 15,
wherein the movement mechanism includes a plurality of driving sources so that any lens group that moves during magnification variation is driven independently by a driving force of a corresponding one of the driving sources.

18. The image-taking apparatus of claim 15,
wherein the movement mechanism includes a driving source and a first driving force transmitter that reduces and transmits a driving force of the driving source to permit a lens group to move along the optical axis, and
wherein only the lens group that remains stationary during variation magnification in moving picture shooting moves during magnification variation in still picture shooting by receiving the driving force of the driving source via the first driving force transmitter.

19. The image-taking apparatus of claim 18,
wherein the movement mechanism further includes a second driving force transmitter that directly transmits the driving force of the driving source to permit a lens group to move along the optical axis, and
wherein the lens group that moves during variation magnification in moving picture shooting moves during magnification variation during both moving picture shooting and still picture shooting by receiving the driving force of the driving source via the second driving force transmitter.

20. The image-taking apparatus of claim 14,
wherein, of the plurality of lens groups, the heaviest lens group remains stationary during magnification variation in moving picture shooting, and moves during magnification variation in still picture shooting.

21. The image-taking apparatus of claim 20,
wherein the lens group that remains stationary during variation magnification in moving picture shooting is located between a first position in which the stationary lens group captures light at the first angle of view during magnification variation in still picture shooting and a second position in which the stationary lens group captures light at the second angle of view during magnification variation in still picture shooting.

22. The image-taking apparatus of claim 20,
wherein the movement mechanism includes a plurality of driving sources so that any lens group that moves during magnification variation is driven independently by a driving force of a corresponding one of the driving sources.

23. The image-taking apparatus of claim 20,
wherein the movement mechanism includes a driving source and a first driving force transmitter that reduces and transmits a driving force of the driving source to permit a lens group to move along the optical axis, and
wherein only the lens group that remains stationary during variation magnification in moving picture shooting moves during magnification variation in still picture shooting by receiving the driving force of the driving source via the first driving force transmitter.

24. The image-taking apparatus of claim 23,
wherein the movement mechanism further includes a second driving force transmitter that directly transmits the driving force of the driving source to permit a lens group to move along the optical axis, and
wherein the lens group that moves during variation magnification in moving picture shooting moves during magnification variation during both moving picture shooting and still picture shooting by receiving the driving force of the driving source via the second driving force transmitter.

25. The image-taking apparatus of claim 14,
wherein an image-sensing area of the image sensor used in moving picture shooting is smaller than an image-sensing area of the image sensor used in still picture shooting.

26. The image-taking apparatus of claim 25, further comprising:
a switcher that performs switching between moving picture shooting and still picture shooting,
wherein, when the switcher performs switching, the lens groups move so that an angle of view of light remains constant between a magnification before switching and a magnification after switching.

27. A lens unit comprising:
a variable-magnification optical system that includes a plurality of lens groups; and an image sensor that receives light having passed through the variable-magnification optical system;

wherein at least one of the plurality of lens groups travels different movement trails during magnification variation of a first type and during magnification variation of a second type;

wherein the plurality of lens groups include at least, from object side to image side:
- a first lens group having a positive optical power,
- a second lens group having a negative optical power,
- a third lens group having a positive optical power, and
- a fourth lens group having a positive optical power; and wherein the first lens group remains stationary when magnification variation of the first type is performed and moves when magnification variation of the second type is performed.

28. The lens unit of claim 27, wherein conditional formula (1) below is fulfilled:

$$6.0 < f1/fw\_ty2 < 20.0 \tag{1}$$

where f1 represents a focal length of the first lens group; and fw_ty2 represents a focal length of the variable-magnification optical system at a wide-angle end of magnification variation of the second type.

29. The lens unit of claim 27, wherein conditional formula (2) below is fulfilled:

$$0.05 < f3/f4 < 1.00 \tag{2}$$

where f3 represents a focal length of the third lens group; and
f4 represents a focal length of the fourth lens group.

30. The lens unit of claim 27, wherein the second lens group includes at least one negative lens element and at least one positive lens element.

31. The lens unit of claim 30, wherein the negative lens element included in the second lens group has an aspherical surface formed thereon.

32. The lens unit of claim 27, wherein conditional formula (3) below is fulfilled:

$$d(GR1-SR)w\_ty2 < d(GR1-SR)\_ty1 < d(GR1-SR)t\_ty2 \tag{3}$$

where d(GR1–SR)w_ty2 represents a distance between the first lens group and an image sensor at a wide-angle end of magnification variation of the second type;

d(GR1–SR)_ty1 represents the distance between the first lens group and the image sensor during magnification variation of the first type; and d(GR1–SR)t_ty2 represents a distance between the first lens group and the image sensor at a telephoto end of magnification variation of the second type.

33. The lens unit of claim 27, wherein conditional formula (4) below is fulfilled:

$$d(GR1-GR2)w\_ty1 < d(GR1-GR2)w\_ty2 \tag{4}$$

where d(GR1–GR2)w_ty1 represents a distance between the first lens group and the second lens group at a wide-angle end of magnification variation of the first type; and d(GR1–GR2)w_ty2 represents a distance between the first lens group and the second lens group at a wide-angle end of magnification variation of the second type.

* * * * *